United States Patent
Han

(10) Patent No.: US 11,886,665 B2
(45) Date of Patent: Jan. 30, 2024

(54) TOUCH SENSING APPARATUS AND TOUCH SENSING METHOD

(71) Applicant: LX Semicon Co., Ltd., Daejeon (KR)

(72) Inventor: Chan Hee Han, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/074,316

(22) Filed: Dec. 2, 2022

(65) Prior Publication Data
US 2023/0176693 A1   Jun. 8, 2023

(30) Foreign Application Priority Data
Dec. 7, 2021   (KR) .................. 10-2021-0173379

(51) Int. Cl.
*G06F 3/041*   (2006.01)
*G06F 3/044*   (2006.01)

(52) U.S. Cl.
CPC ........ *G06F 3/04186* (2019.05); *G06F 3/0446* (2019.05)

(58) Field of Classification Search
CPC .............. G06F 3/04186; G06F 3/0446; G06F 2203/04104; G06F 3/04166; G06F 3/0443; G06F 3/0418; G06F 3/0412; G06F 3/044
See application file for complete search history.

(56) References Cited

U.S. PATENT DOCUMENTS

| | | | | |
|---|---|---|---|---|
| 2006/0267953 A1* | 11/2006 | Peterson | ............. | G06F 3/04186 345/173 |
| 2011/0109552 A1* | 5/2011 | Yasutake | ............. | G06F 3/04883 345/173 |
| 2013/0141368 A1* | 6/2013 | Wang | ............. | G06F 3/0443 345/173 |
| 2013/0207934 A1* | 8/2013 | Jang | ............. | G06F 3/04166 345/174 |
| 2013/0234993 A1* | 9/2013 | Zhang | ............. | G06F 3/0418 345/175 |
| 2013/0285975 A1* | 10/2013 | Hong | ............. | G06F 3/0416 345/173 |
| 2014/0104234 A1* | 4/2014 | Chang | ............. | G06F 3/0448 345/174 |
| 2015/0153945 A1* | 6/2015 | Chen | ............. | G06F 3/04883 345/175 |
| 2017/0277328 A1* | 9/2017 | Kurasawa | ............. | G06F 3/0412 |
| 2018/0188878 A1* | 7/2018 | Ponnarasu | ............. | G06F 3/04186 |
| 2019/0113998 A1* | 4/2019 | Cao | ............. | G06F 3/0446 |
| 2019/0258380 A1* | 8/2019 | Chen | ............. | G06F 3/0488 |
| 2021/0255729 A1* | 8/2021 | Jung | ............. | G06F 3/0416 |
| 2022/0027012 A1* | 1/2022 | Kim | ............. | G06F 3/0412 |

(Continued)

FOREIGN PATENT DOCUMENTS

KR   101201979 B1   11/2012
KR   102006262 B1   8/2019

*Primary Examiner* — Amy Onyekaba
(74) *Attorney, Agent, or Firm* — POLSINELLI PC

(57) ABSTRACT

The present disclosure relates to a technology for sensing a touch panel, in which vertical pattern electrodes and horizontal pattern electrodes are disposed, and provides a method for determining the sense of two touches when two touches are sensed in a touch panel and a method for preventing a ghost touch when changing data in an SNS touch pattern to data in a normal pattern at the time of sensing two touches.

16 Claims, 17 Drawing Sheets

(56) References Cited

U.S. PATENT DOCUMENTS

| | | | |
|---|---|---|---|
| 2023/0067179 A1* | 3/2023 | Kim | H02J 50/12 |
| 2023/0281517 A1* | 9/2023 | Liu | G06N 20/00 706/12 |

* cited by examiner

*FIG. 9*

| a_H1 | | | | b_H1 | | | | c_H1 | | | |
|---|---|---|---|---|---|---|---|---|---|---|---|
| a_V1 | a_V2 | a_V3 | a_V4 | b_V1 | b_V2 | b_V3 | b_V4 | c_V1 | c_V2 | c_V3 | c_V4 |
| a_H2 | | | | b_H2 | | | | c_H2 | | | |
| a_V1 | a_V2 | a_V3 | a_V4 | b_V1 | b_V2 | b_V3 | b_V4 | c_V1 | c_V2 | c_V3 | c_V4 |
| a_H3 | | | | b_H3 | | | | c_H3 | | | |
| a_V1 | a_V2 | a_V3 | a_V4 | b_V1 | b_V2 | b_V3 | b_V4 | c_V1 | c_V2 | c_V3 | c_V4 |
| a_H4 | | | | b_H4 | | | | c_H4 | | | |
| a_V1 | a_V2 | a_V3 | a_V4 | b_V1 | b_V2 | b_V3 | b_V4 | c_V1 | c_V2 | c_V3 | c_V4 |
| d_H1 | | | | e_H1 | | | | f_H1 | | | |
| d_V1 | d_V2 | d_V3 | d_V4 | e_V1 | e_V2 | e_V3 | e_V4 | f_V1 | f_V2 | f_V3 | f_V4 |
| d_H2 | | | | e_H2 | | | | f_H2 | | | |
| d_V1 | d_V2 | d_V3 | d_V4 | e_V1 | e_V2 | e_V3 | e_V4 | f_V1 | f_V2 | f_V3 | f_V4 |
| d_H3 | | | | e_H3 | | | | f_H3 | | | |
| d_V1 | d_V2 | d_V3 | d_V4 | e_V1 | e_V2 | e_V3 | e_V4 | f_V1 | f_V2 | f_V3 | f_V4 |
| d_H4 | | | | e_H4 | | | | f_H4 | | | |
| d_V1 | d_V2 | d_V3 | d_V4 | e_V1 | e_V2 | e_V3 | e_V4 | f_V1 | f_V2 | f_V3 | f_V4 |
| g_H1 | | | | h_H1 | | | | i_H1 | | | |
| g_V1 | g_V2 | g_V3 | g_V4 | h_V1 | h_V2 | h_V3 | h_V4 | i_V1 | i_V2 | i_V3 | i_V4 |
| g_H2 | | | | h_H2 | | | | i_H2 | | | |
| g_V1 | g_V2 | g_V3 | g_V4 | h_V1 | h_V2 | h_V3 | h_V4 | i_V1 | i_V2 | i_V3 | i_V4 |
| g_H3 | | | | h_H3 | | | | i_H3 | | | |
| g_V1 | g_V2 | g_V3 | g_V4 | h_V1 | h_V2 | h_V3 | h_V4 | i_V1 | i_V2 | i_V3 | i_V4 |
| g_H4 | | | | h_H4 | | | | i_H4 | | | |
| g_V1 | g_V2 | g_V3 | g_V4 | h_V1 | h_V2 | h_V3 | h_V4 | i_V1 | i_V2 | i_V3 | i_V4 |

TOUCH SENSING APPARATUS AND TOUCH SENSING METHOD

CROSS REFERENCE TO RELATED APPLICATION

This application claims priority to Republic of Korea Patent Application No. 10-2021-0173379, filed on Dec. 7, 2021, which is hereby incorporated by reference in its entirety.

BACKGROUND

1. Field of Technology

The exemplary embodiment relates to a touch sensing apparatus and a touch sensing method which sense a touch by an electrode disposed in a touch panel.

2. Related Technology

Recently, a display panel has adopted a lot of touch functions from small electronics (e.g., smartphone) to large electronics (e.g., TV or electronic blackboard). In this case, most display panels are implemented as a flat panel display device such as a liquid crystal display, and the touch function is implemented as a touch panel combined with the display panel.

The touch panel refers to a transparent switch panel that has the ability to manipulate the device or execute the program as a user presses a text, an image, or an icon. The touch panel can be configured to perform touch recognition in a capacitive method, and as an example of a touch panel that implements the capacitive touch recognition, a "mutual capacitance touch sensing apparatus" was released as "U.S. Pat. No. 2009/0091551". A general touch pattern is independent of the display panel and is manufactured separately and combined with the display panel.

On the other hand, in the touch panel, touch electrodes (TE) (or electrodes (EL)) may be disposed according to a specific arrangement method (or specific pattern) having a predetermined size. For example, touch electrodes having a predetermined size may be arranged in the form of an N*M matrix according to the size of the display device or the size of the touch panel. When a specific object (e.g., a hand or an electronic pen) is in contact with a plurality of touch electrodes disposed on the touch panel, each touch electrode can sense the contact of the object. The touch sensing apparatus may determine a position (or touch coordinates) touched by the object through the position of the touch electrode sensing the contact of the object.

An arrangement method (or a pattern of the touch electrode) of the touch electrode disposed in the touch panel may be implemented in various forms, and in general, touch electrodes having the same size may be arranged in a matrix form. Meanwhile, when the arrangement method (or the pattern of the touch electrode) of the touch electrode disposed in the touch panel is changed, an algorithm for determining the touch position (or touch coordinates) may be changed. As a result, when the existing touch pattern of processing scheme is applied to the change pattern of the touch pattern, there may be a problem in that an inaccurate result is output.

As an example, when two touches are input in the changed pattern of the touch electrode, there is a problem in that an inaccurate result that a portion which is not actually touched is recognized to be touched is output.

The discussions in this section are only to provide background information and does not constitute an admission of prior art.

SUMMARY

In this background, an object of the exemplary embodiment is to provide a touch sensing apparatus, and a touch sensing method that can determine exact coordinates such as a pattern of the existing touch electrode, even if the pattern of the touch electrode is changed, in an aspect.

Further, an object of the exemplary embodiment is to provide a touch sensing apparatus, and a touch sensing method that minimize an error which may occur when the pattern of the touch electrode is changed and changed coordinate determination is performed, in an aspect.

Further, an object of the exemplary embodiment is to provide a touch sensing apparatus and a touch sensing method that minimize an error that an inaccurate result that a second touch is also recognized as a portion which is not actually touched is output in the changed pattern of the touch electrode, in an aspect.

In order to achieve the object, in an aspect, the exemplary embodiment provides a touch sensing apparatus sensing a touch of a panel in which a plurality of vertical pattern electrodes and a plurality of horizontal pattern electrodes, which includes: a touch sensing circuit identifying touch coordinates based on sensing values sensed by the plurality of vertical pattern electrodes and the plurality of horizontal pattern electrodes, and the touch sensing circuit calculates a first touch electrode value acquired by summing up sensing values sensed by a plurality of second-direction pattern electrodes and sensing values sensed by a plurality of first-direction pattern electrodes close to a first touch and a second touch electrode value acquired by summing up sensing values sensed by a plurality of second-direction pattern electrodes and sensing values sensed by a plurality of first-direction pattern electrodes close to a second touch, and determines that two touches occur in a diagonal direction when a sum of the first touch electrode value and the second touch electrode value is greater than a predetermined threshold value.

In another aspect, the exemplary embodiment provides a touch sensing method sensing a touch from sensing values sensed by a plurality of touch electrodes disposed in a panel, which includes: receiving sensing values sensed by a plurality of first-direction pattern electrodes and a plurality of second-direction pattern electrodes disposed in a panel; calculating a first touch electrode value acquired by summing up sensing values sensed by a plurality of second-direction pattern electrodes and sensing values sensed by a plurality of first-direction pattern electrodes close to a first touch and a second touch electrode value acquired by summing up sensing values sensed by a plurality of second-direction pattern electrodes and sensing values sensed by a plurality of first-direction pattern electrodes close to a second touch; and determining that two touches occur in a diagonal direction when a sum of the first touch electrode value and the second touch electrode value is greater than a predetermined threshold value.

In yet another aspect, the exemplary embodiment provides a touch sensing apparatus which includes a touch sensing circuit ifentifying touch coordinates based on sensing values of first-direction electrodes and sensing values of second-direction electrodes intersecting a first direction, and in which the touch sensing circuit calculates a first touch electrode value acquired by summing up sensing values of first-direction electrode and second-direction electrodes close to a first touch, calculates a second touch electrode value acquired by summing up sensing values of first-direction electrodes and second-direction electrodes close to a second touch, and determines that two touches occur in a diagonal direction when a sum of the first touch electrode value and the second touch electrode value is greater than a predetermined threshold value.

Data of N*M*2 sub patterns may be generated from sensing values sensed by N (N is a natural number) first-direction electrodes and M (M is the natural number) second-direction electrodes.

The sub patterns may form a matrix constituted by M*2 rows and N columns.

Each first-direction electrode may be separated from the plurality of first-direction sub patterns and disposed on a panel, and one touch driving line may be connected between the plurality of separated first-direction sub patterns.

The data of each of the plurality of first-direction sub patterns may be determined based on a sensing value sensed by a second-direction electrode adjacent to an upper portion of each first-direction sub pattern and a sensing value sensed by a second-direction electrode adjacent to a lower portion of each first-direction sub pattern.

The data of each of the plurality of second-direction sub patterns may be determined based on data of the first-direction sub pattern adjacent to the upper portion of each second-direction sub pattern and data of the first-direction sub pattern adjacent to the lower portion of each second-direction sub pattern.

As described above, according to the exemplary embodiment, even if the pattern of the touch electrode is changed, the data conversion process may make an accurate coordinate judgment such as the pattern of the existing touch electrode.

In addition, according to the exemplary embodiment, sensing data of a matrix pattern can be acquired from sensing values sensed for a plurality of vertical pattern electrodes and a plurality of horizontal pattern electrodes.

In addition, according to the exemplary embodiment, a relatively smaller number of touch electrodes are arranged for the same area, but more data is generated to judge touch coordinates more precisely and accurately.

In addition, according to the exemplary embodiment, the pattern of the touch electrode is changed and an error which occurs through the data conversion process is minimized to perform accurate coordinate judgment such as the pattern of the existing touch electrode.

In addition, according to the exemplary embodiment, when a second touch is input into the touch electrode, a data conversion process of minimizing an error that a point other than the second touch is recognized to be touched can be provided.

BRIEF DESCRIPTION OF THE DRAWINGS

FIG. 9 is a diagram illustrating sensed data of the touch patterns of a 9 (3*3) array according to an exemplary embodiment.

FIGS. 10A to 10D are diagrams illustrating the data conversion process between the touch patterns according to an exemplary embodiment.

FIGS. 12A and 12B are diagrams illustrating the data conversion process between the touch patterns upon second touch judgment according to an exemplary embodiment.

DETAILED DESCRIPTION OF EMBODIMENTS

Figure 1:
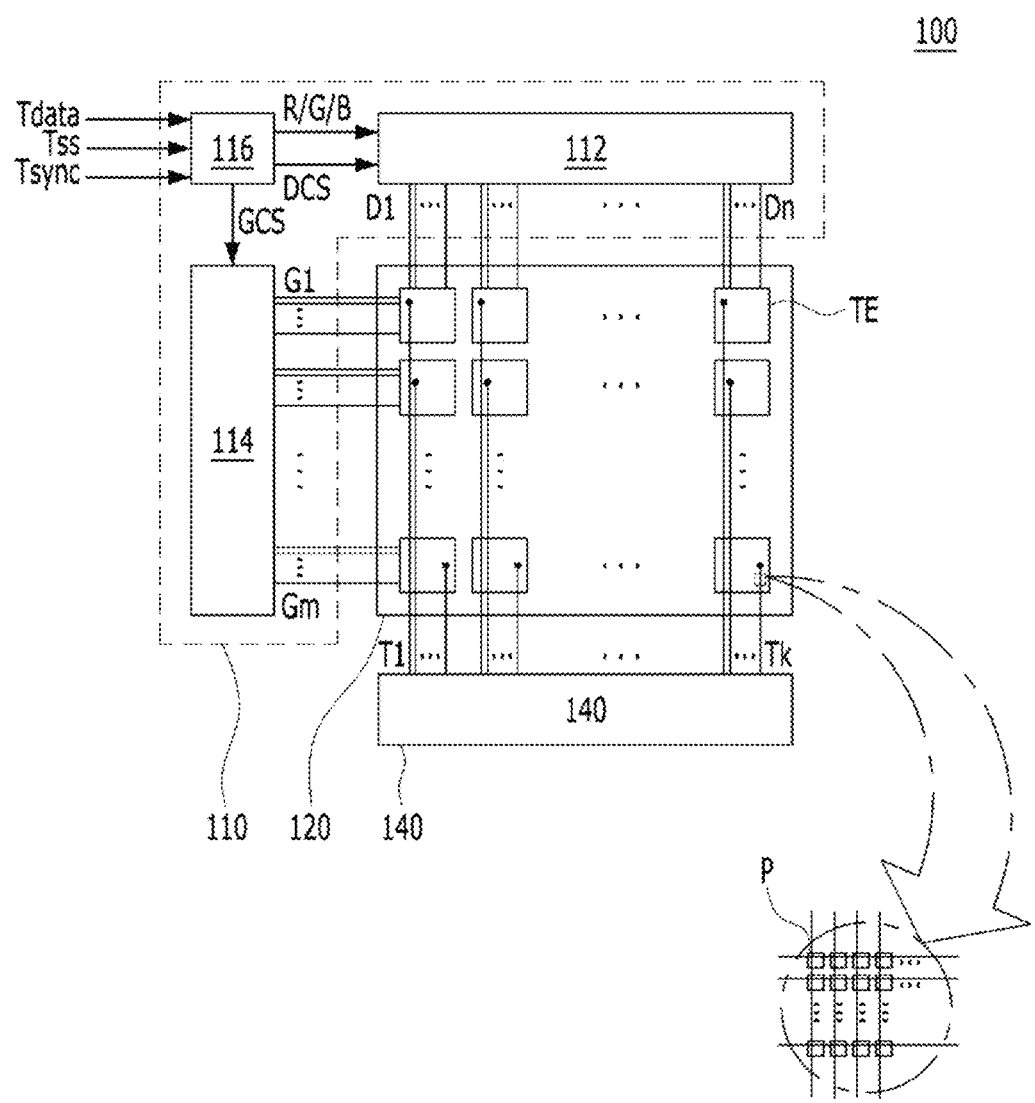
FIG. 1 is a configuration diagram of a display device including a touch sensing apparatus according to an exemplary embodiment.

FIG. 1 is a configuration diagram of a display device including a touch sensing apparatus according to an exemplary embodiment. As illustrated in FIG. 1, the display device 100 according to an exemplary embodiment of the present disclosure which performs a display function and a touch sensing function may be implemented as a flat panel display such as a liquid crystal display (LCD) or an organic light emitting diode (OLED). Although exemplary embodiments to be described below describe the LCD, the present disclosure is not limited thereto, and may be applied to displays based on the LED or OLED in the same or similar manner.

In an exemplary embodiment, the display device 100 according to the present disclosure may include a capacitive touch screen implemented integrally therein in order to sense a touch by a contact of a conductive object such as a finger or an active pen. The touch screen may be configured independently of a display panel for implementing the display or embedded in a pixel array of the display panel.

As illustrated in FIG. 1, the display device 100 according to an exemplary embodiment of the present disclosure includes a panel driving device 110, a panel 120 (e.g., a display panel or a touch panel), and a touch sensing circuit 140.

The panel 120 displays an image with a predetermined grayscale or receives the touch by the hand (or finger) or the active pen (or electronic pen). The panel 120 may be a display panel having an in-cell touch type structure using a capacitance scheme. In an exemplary embodiment, the panel 120 may be an in-cell touch type display panel using a self capacitance scheme or an in-cell touch type display panel using a mutual capacitance scheme. Hereinafter, for convenience of description, it will be described that the panel 120 is the in-cell touch type display panel using the self capacitance scheme.

The panel 120 may operate in a display mode and a touch sensing mode. The panel 120 may display the image by using light irradiated from a backlight unit during the display mode and serve as the touch panel for touch sensing during the touch sensing mode.

The panel driving device 110 may include a data driving circuit 112, a gate driving circuit 114, and a timing controller 116. Each of the data driving circuit 112, the gate driving circuit 114, and the touch sensing circuit 140 may drive at least one component included in the panel 120.

The data driving circuit 112 may drive a data line DL (e.g., D1 to Dn) connected to a pixel P, and the gate driving circuit 114 may drive a gate line GL (e.g., G1 to Gm) connected to the pixel P. In addition, the touch sensing circuit 140 may drive an electrode EL or a touch electrode TE disposed in the panel 120.

The data driving circuit 112 may supply data voltage to the data line DL in order to display the image in each pixel P of the panel 120. The data driving circuit 112 may include at least one data driver integrated circuit, and at least one data driver integrated circuit may be connected to a bonding pad of the panel 120 by a tape automated bonding (TAB) scheme or a chip on glass (COG) scheme, or also directly formed in the panel 120, and in some cases, at least one data driver integrated circuit may be integrated and formed in the panel 120. Further, the data driving circuit 112 may be implemented by a chip on film (COF) scheme.

The gate driving circuit 114 may supply a scan signal to the gate line GL in order to turn on and off a transistor located in each pixel P. The gate driving circuit may also be located only on one side of the panel 120 as in FIG. 1, and also divided into two and located on both sides of the panel 120 according to the driving scheme. Further, the gate driving circuit 114 may include at least one gate driver integrated circuit, and at least one gate driver integrated circuit may be connected to the bonding pad of the panel 120 by the tape automated bonding (TAB) scheme or the chip on glass (COG) scheme, or also implemented as a gate in panel (GIP) type and directly formed in the panel 120, and in some cases, at least one gate driver integrated circuit may be integrated and formed in the panel 120. Further, the gate driving circuit 114 may be implemented by the chip on film (COF) scheme.

The panel 120 may include only a touch screen panel (TSP), and also further include a display panel. Here, the touch panel and the display panel may share some components with each other. For example, the touch electrode (TE) for detecting the touch in the touch panel may be used as a common voltage electrode to which common voltage is supplied in the display panel. In terms of the fact that some components of the display panel and the touch panel are shared with each other, the panel 120 is called an integrated panel, but the present disclosure is not limited. In addition, the in-cell type panel is known as a form in which the display panel and the touch panel are integrated, but this is an example of the panel 120 described above, and the panel to which the present disclosure is applied is not limited to the in-cell type panel.

On the other hand, a plurality of touch electrodes may be arranged in the panel 120, and the touch sensing circuit 140 may drive the touch electrode TE using a driving signal. In addition, the touch sensing circuit 140 may generate a sensing value for the touch electrode TE according to a reaction signal formed in the touch electrode TE in response to the driving signal. In addition, the touch sensing circuit 140 may calculate touch coordinates using a sensing value for the plurality of touch electrode disposed on the panel 120, and the calculated touch coordinates may be transmitted to another device (e.g., a host, a controller, or a processor) and utilized.

Figure 2:
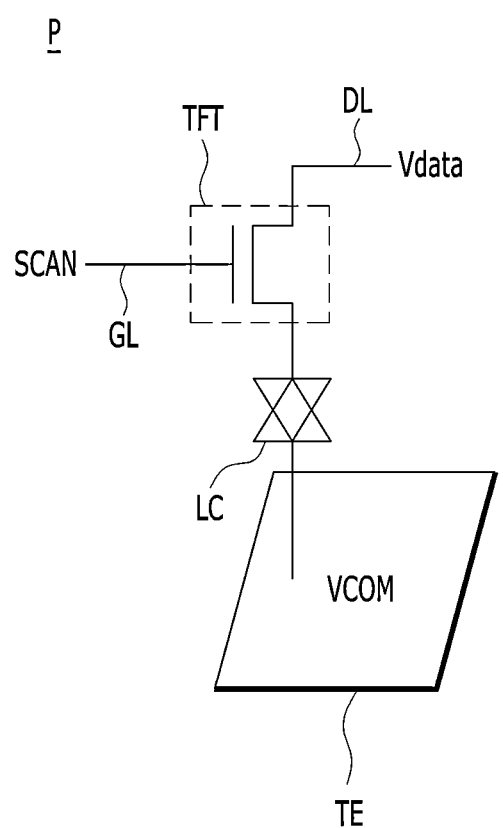
FIG. 2 is an internal configuration diagram of a pixel when a touch electrode is used as a common voltage electrode according to an exemplary embodiment.

FIG. 2 is an internal configuration diagram of a pixel when a touch electrode is used as a common voltage electrode according to an exemplary embodiment. Referring to FIG. 2, the pixel P may include a transistor (e.g., TFT), a liquid crystal LC and a common voltage electrode VCOM. A gate terminal of the transistor TFT may be connected to the gate line GL, a drain terminal may be connected to the data line DL, and a source terminal may be connected to the liquid crystal LC.

When a scan signal SCAN corresponding to turned-on voltage is supplied to the gate terminal through the gate line GL, the drain terminal and the source terminal of the transistor TFT are conducted and data voltage Vdata may be supplied to the liquid crystal LC. Common voltage may be supplied to the common voltage electrode VCOM, and brightness of the pixel P may be controlled while the liquid crystal LC is controlled according to a difference between the common voltage and the data voltage V data.

Meanwhile, the common voltage electrode VCOM may be the same electrode as the touch electrode TE driven by the touch sensing circuit (see reference numeral 140 of FIG. 1) described with reference to FIG. 1, but is just described as an example, and the exemplary embodiments of the present disclosure are not limited thereto.

Figure 3:
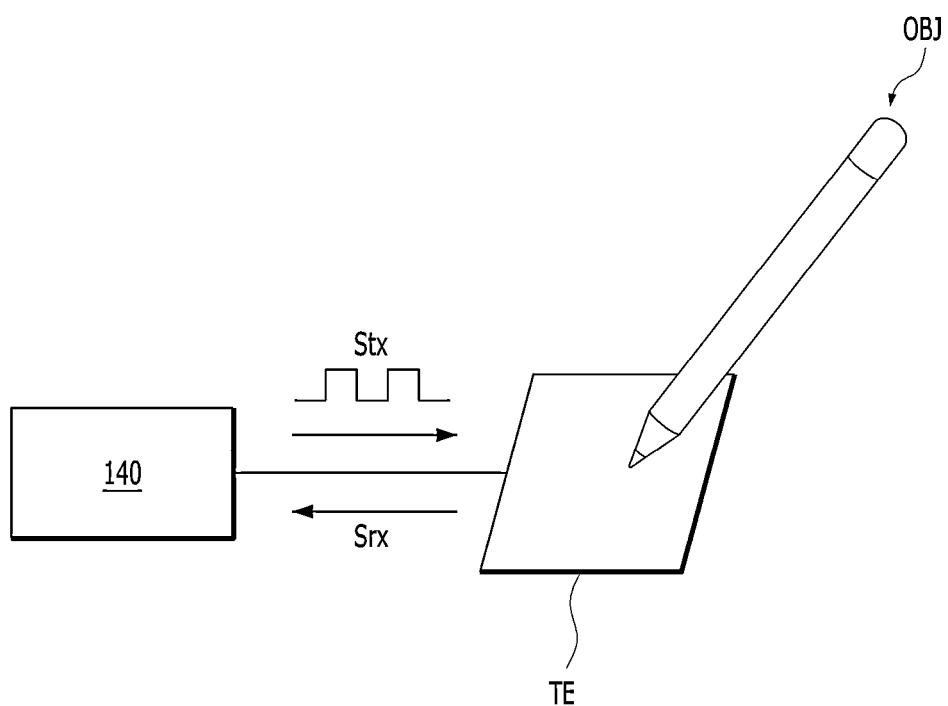
FIG. 3 is a diagram illustrating that a touch sensing circuit drives the touch electrode according to an exemplary embodiment.

FIG. 3 is a diagram illustrating that a touch sensing circuit drives the touch electrode according to an exemplary embodiment. Referring to FIG. 3, the touch sensing circuit 140 may drive the touch electrode TE by using a driving signal Stx, and sense a touch or an approach of an external object OBJ for the panel according to a reaction signal Srx formed in the touch electrode TE in response to the driving signal Stx.

In this case, the touch sensing circuit 140 may adopt an electrostatic touch scheme that senses a capacitance or a capacitance change of the touch electrode TE to recognize the approach or touch of the object OBJ.

The electrostatic touch scheme may be divided into a mutual capacitance touch scheme and a self capacitance touch scheme, as an example. The mutual capacitance touch scheme which is one type of the electrostatic touch scheme applies the touch driving signal Stx to one touch electrode and senses the other one touch electrode which is coupled to one touch electrode. In such a mutual capacitance touch scheme, a value sensed in the other one touch electrode depends on the touch or approach of the object OBJ such as the finger, the pen, etc., and the mutual capacitance touch scheme detects whether the touch is made, touch coordinates, etc., by using the sensing value.

The self capacitance touch scheme which is the other one type of the electrostatic touch scheme applies the touch driving signal Stx to one touch electrode, and then senses the one touch electrode again. In such a self capacitance touch scheme, the value sensed in the r one touch electrode depends on the touch or approach of the object OBJ such as the finger, the pen, etc., and the self capacitance touch scheme detects whether the touch is made, touch coordinates, etc., by using the sensing value. In such a self capacitance touch scheme, the touch electrode to which the touch driving signal Stx is applied and the sensed touch electrode are the same.

An exemplary embodiment may be applied to the mutual capacitance touch scheme and also applied to the self capacitance touch scheme. In some examples below, for convenience of description, a case where an exemplary embodiment is applied to the self capacitance touch scheme will be described.

Figure 4:
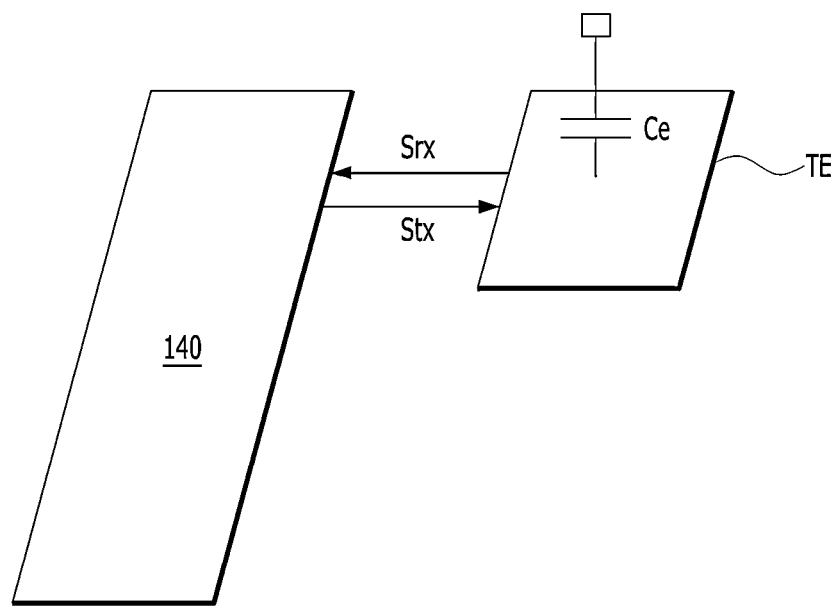
FIG. 4 is an exemplary diagram illustrating a base capacitance according to an exemplary embodiment.

FIG. 4 is an exemplary diagram illustrating a base capacitance according to an exemplary embodiment. Referring to FIG. 4, when there is no touch or approach of the external object, a base capacitance Ce may be formed in the touch electrode TE. Meanwhile, the touch sensing circuit 140 may supply the driving signal Stx to the touch electrode TE and receive the reaction signal Srx from the touch electrode TE. In addition, the touch sensing circuit 140 may verify a sensing value corresponding to the capacitance of the touch electrode TE by using the reaction signal Srx, and when the sensing value is different from the base sensing value corresponding to the base capacitance Ce, the touch sensing circuit 140 may recognize that the external object approaches or touches the touch electrode TE.

Figure 5:
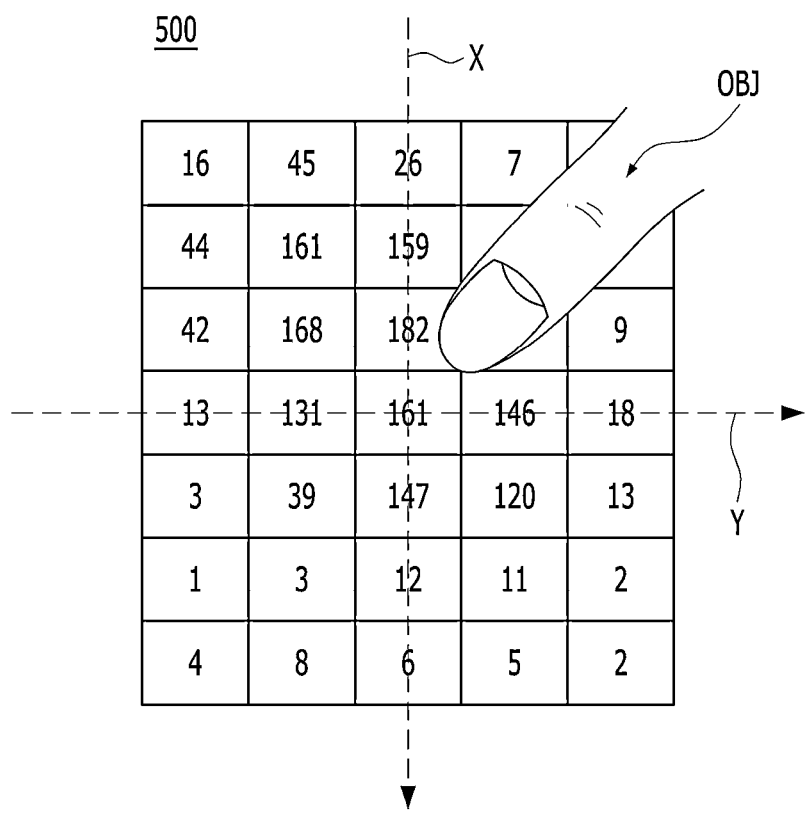
FIG. 5 is an exemplary diagram of data corresponding to the touch electrode according to an exemplary embodiment.

FIG. 5 is an exemplary diagram of data corresponding to the touch electrode according to an exemplary embodiment. A touch image illustrated in FIG. 5 may mean a table in which the sensing value displayed to correspond to the location of the touch electrode. Referring to the touch image illustrated in FIG. 5, with the touch of the external object OBJ, a sensing value of a third touch electrode in an X line represents a highest value as 182, and it can be seen that a sensing value is smaller as being further from the touch electrode. The sensing value for the X line of FIG. 5 may show a consecutive curve form, and the touch sensing circuit 140 may calculate the touch coordinates by inputting various sensing values verified along a predetermined line into a specific model or algorithm. For example, the touch sensing circuit 140 may calculate a first touch coordinate T1 in an X line direction by substituting three or more sensing values verified along the X line into a predetermined function, e.g., a Gaussian curve. Likewise, the touch sensing circuit 140 may calculate a second touch coordinate in a Y line direction. When the touch coordinates are calculated for two directions orthogonal to each other, the touch coordinates may be calculated on a plane.

Hereinafter, a data conversion method between the touch patterns according an exemplary embodiment will be described.

Figure 6:
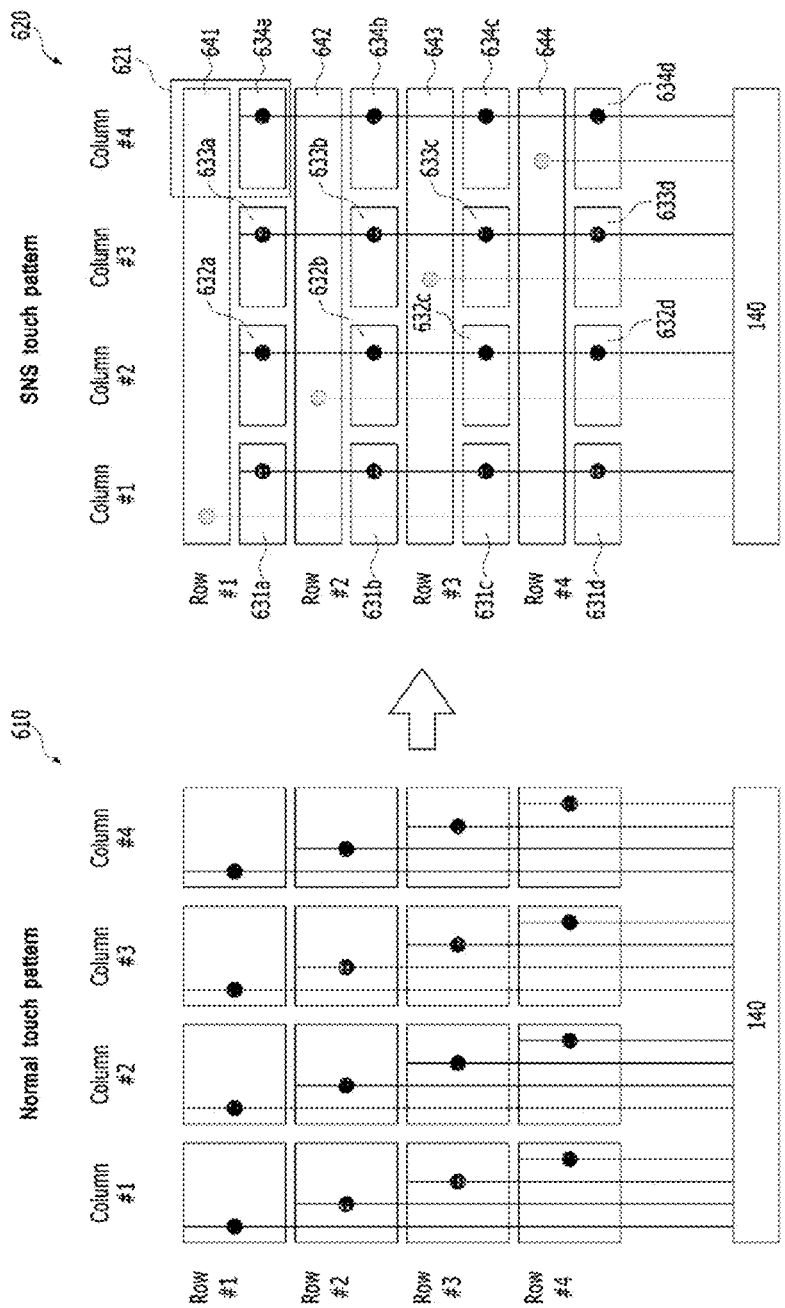
FIG. 6 is a diagram illustrating a comparison between touch patterns according to an exemplary embodiment.

FIG. 6 is a diagram illustrating a comparison between touch patterns according to an exemplary embodiment. Referring to FIG. 6, the touch electrodes TE disposed in the panel 120 may be arranged in the form of a matrix as illustrated on the left side of FIGS. 1 and 6. Hereinafter, the matrix type array form will be referred to as a normal touch pattern 610 for convenience of description.

In the normal touch pattern 610, the touch electrodes TE may be disposed with a constant size and at regular intervals according to each row and column. For example, when the touch electrodes (TE) are disposed in four rows and four columns in the normal touch pattern 610, a total of 16 touch electrodes may be disposed. In the normal touch pattern 610, the touch electrodes TE having an array of 4*4 may be referred to as one unit array for convenience, but is not limited thereto. According to the size of the display device or the size of the touch panel, the unit array may be repeatedly formed by a horizontal axis and/or a vertical axis, so that the touch electrodes (TE) that fit the size may be disposed. In the following description, it will be described based on one unit array for convenience.

The sensing value sensed in each touch electrode TE in the normal touch pattern 610 may be input to the touch sensing circuit 140. For example, the touch sensing circuit 140 may obtain 16 sensing values from 16 touch electrodes TE contained in the unit array. The touch sensing circuit 140 may determine a touch position of the object or whether the object is touched based on the sensing value for each touch electrode TE.

Referring back to FIG. 6, the touch electrodes TE disposed in the panel 120 may be arranged in a form in which a plurality of vertical pattern electrodes 631, 632, 633, 634 and a plurality of horizontal pattern electrodes 641, 642, 643, and 644 intersect each other as illustrated on the right side of FIG. 6. Hereinafter, the arrangement type of the pattern as described above is referred to as a self in self (SNS) touch pattern 620 for the convenience of description, and the present disclosure is not limited to the term. In the SNS touch pattern 620, the touch electrodes TE may be arranged in the form in which a plurality of vertical pattern electrodes and a plurality of horizontal pattern electrodes intersect each other according to each row and each column. For example, when the touch electrodes (TE) are disposed in four rows and four columns in the SNS touch pattern 620, a total of 8 touch electrodes may be disposed. In the SNS touch pattern 620, the touch electrodes TE disposed in four rows and four columns may be referred to as one unit array for convenience, but are not limited thereto. According to the size of the display device or the size of the touch panel, the unit array may be repeatedly formed by a horizontal axis and/or a vertical axis, so that the touch electrodes (TE) that fit the size may be disposed. In the following description, it will be described based on one unit array for convenience.

For example, as illustrated on the right side of FIG. 6, in the SNS touch pattern 620, a first vertical pattern electrode 631 may be disposed in a first column (Column #1), a second vertical pattern electrode 632 may be disposed in a second column (Column #2), a third vertical pattern electrode 633 may be disposed in a third column (Column #3), and a fourth vertical pattern electrode 634 may be disposed in a fourth column (Column #4). Each of the vertical pattern electrodes 631, 632, 633, and 634 may include a plurality of vertical sub pattern electrodes.

For example, the first vertical pattern electrode 631 disposed in the first column may include a 1-$1^{st}$ vertical sub pattern electrode 631a, a 1-$2^{nd}$ vertical sub pattern electrode 631b, a 1-$3^{rd}$ vertical sub pattern electrode 631c, and a 1-$4^{th}$ vertical sub pattern electrode 631d for each row. The respective vertical sub pattern electrodes 631a, 631b, 631c, and 631d of the first vertical pattern electrode 631 may be physically divided and disposed for each row. Further, the respective vertical sub pattern electrodes 631a, 631b, 631c, and 631d of the first vertical pattern electrode 631 are physically divided and disposed, but may be electrically connected to one as illustrated in FIG. 6. For example, the respective vertical sub pattern electrodes 631a, 631b, 631c, and 631d of the first vertical pattern electrode 631 may be connected from the touch sensing circuit 140 by one common line.

Further, the second vertical pattern electrode 632 disposed in the second column may include a 2-$1^{st}$ vertical sub pattern electrode 632a, a 2-$2^{nd}$ vertical sub pattern electrode 632b, a 2-$3^{rd}$ vertical sub pattern electrode 632c, and a 2-$4^{th}$ vertical sub pattern electrode 632d for each row. The respective vertical sub pattern electrodes 632a, 632b, 632c, and 632d of the second vertical pattern electrode 632 may be physically divided and disposed for each row. Further, the respective vertical sub pattern electrodes 632a, 632b, 632c, and 632d of the second vertical pattern electrode 632 are physically divided and disposed, but may be electrically connected to one as illustrated in FIG. 6. For example, the respective vertical sub pattern electrodes 632a, 632b, 632c, and 632d of the second vertical pattern electrode 632 may be connected from the touch sensing circuit 140 by one common line.

Further, the third vertical pattern electrode 633 disposed in the third column may include a 3-$1^{st}$ vertical sub pattern electrode 633a, a 3-$2^{nd}$ vertical sub pattern electrode 633b, a 3-$3^{rd}$ vertical sub pattern electrode 633c, and a 3-$4^{th}$ vertical sub pattern electrode 633d for each row. The respective vertical sub pattern electrodes 633a, 633b, 633c, and 633d of the third vertical pattern electrode 633 may be physically divided and disposed for each row. Further, the respective vertical sub pattern electrodes 633a, 633b, 633c, and 633d of the third vertical pattern electrode 633 are physically divided and disposed, but may be electrically connected to one as illustrated in FIG. 6. For example, the respective vertical sub pattern electrodes 633a, 633b, 633c, and 633d of the third vertical pattern electrode 633 may be connected from the touch sensing circuit 140 by one common line.

Further, the fourth vertical pattern electrode 634 disposed in the fourth column may include a 4-1$^{st}$ vertical sub pattern electrode 634a, a 4-2$^{nd}$ vertical sub pattern electrode 634b, a 4-3$^{rd}$ vertical sub pattern electrode 634c, and a 4-4$^{th}$ vertical sub pattern electrode 634d for each row. The respective vertical sub pattern electrodes 634a, 634b, 634c, and 634d of the fourth vertical pattern electrode 634 may be physically divided and disposed for each row. Further, the respective vertical sub pattern electrodes 634a, 634b, 634c, and 634d of the fourth vertical pattern electrode 634 are physically divided and disposed, but may be electrically connected to one as illustrated in FIG. 6. For example, the respective vertical sub pattern electrodes 634a, 634b, 634c, and 634d of the fourth vertical pattern electrode 634 may be connected from the touch sensing circuit 140 by one common line.

According to an exemplary embodiment, in the SNS touch pattern 620, a first horizontal pattern electrode 641 may be disposed in a first row (Row #1), a second horizontal pattern electrode 642 may be disposed in a second row (Row #2), a third horizontal pattern electrode 643 may be disposed in a third row (Row #3), and a fourth horizontal pattern electrode 644 may be disposed in a fourth row (Row #4). In FIG. 6 above, the respective horizontal pattern electrodes 641, 642, 643, and 644 are illustrated as one electrode, and may have one physical form, but each of the horizontal pattern electrodes 641, 642, 643, and 644 may include a plurality of horizontal sub pattern electrodes. For example, in the SNS touch pattern 620, a group 621 of one horizontal sub pattern electrode and one vertical sub pattern electrode may correspond to each touch electrode in the normal touch pattern 610.

According to an exemplary embodiment, the plurality of vertical pattern electrodes may be referred to as a first-direction electrode and the plurality of horizontal pattern electrodes may be referred to as a second-direction electrode. The second direction may be vertical to the first direction.

According to an exemplary embodiment, when the normal touch pattern 610 and the SNS touch pattern 620 are compared with each other, the number of touch electrodes and the sensing values sensed by the touch electrode in the SNS touch pattern 620 may be smaller than those in the normal touch pattern 610. That is, referring to FIG. 6, in the normal touch pattern 610 for one unit array including four rows and four columns, the touch sensing circuit 140 may collect 16 sensing values from a total of 16 touch electrodes. On the contrary, in the SNS touch pattern 620 for one unit array including four rows and four columns, the touch sensing circuit 140 may collect 8 sensing values from a total of 8 touch electrodes. Meanwhile, as described below, the SNS touch pattern 620 may include a plurality of (e.g., 4) sub patterns for each of the plurality of vertical pattern electrodes and the plurality of horizontal pattern electrodes, and data for each sub pattern may be acquired. As a result, for the unit array of the SNS touch pattern 620, 16 (4*4) data are acquired from four horizontal pattern electrodes and 16 (4*4) data are acquired from four vertical pattern electrodes to acquire a total of 32 (16 +16) data. Therefore, when the normal touch pattern 610 and the SNS touch pattern 620 are compared with each other, the number of touch electrodes and the sensing values sensed by the touch electrode in the SNS touch pattern 620 may be relatively smaller than those in the normal touch pattern 610, but the number of acquired data in the SNS touch pattern 620 may be greater than that in the normal touch pattern 610. In the example of FIG. 6, the number of data acquired in one unit array is 16 in the normal touch pattern 610, while 32 in the SNS touch pattern 620, so it can be seen that the number of data is doubled.

According to an exemplary embodiment, in the description of FIG. 6, the SNS touch pattern 620 may be referred to as a first touch pattern and the normal touch pattern 610 may be referred to as a second touch pattern. In a description to be made below, a method for acquiring data corresponding to the second touch pattern (e.g., normal touch pattern 610) from the sensing value sensed through the first touch pattern (e.g., SNS touch pattern 620) will be described.

Figure 7:
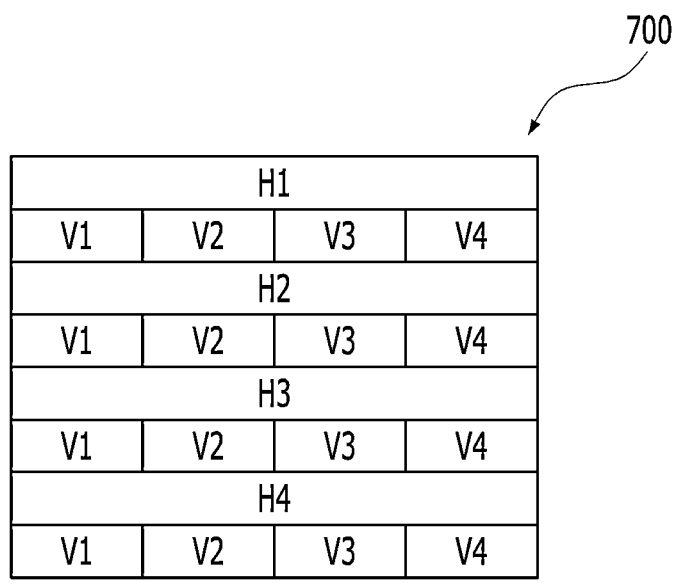
FIG. 7 is a diagram illustrating sensed data of the touch patterns according to an exemplary embodiment.

FIG. 7 is a diagram illustrating sensed data of the touch patterns according to an exemplary embodiment. According to an exemplary embodiment, the data sensed in one unit array of the first touch pattern (e.g., SNS touch pattern 620) of FIG. 6 may be represented as sensing data 700 illustrated in FIG. 7.

Referring to FIG. 7, the sensing data 700 sensed from the first touch pattern (e.g., SNS touch pattern 620) of FIG. 6 may be represented by four vertical pattern data (e.g., V1, V2, V3, and V4) and four horizontal pattern data (e.g., H1, H2, H3, and H4). As described above, according to an exemplary embodiment, each vertical pattern electrode may be divided into four physical regions, and in FIG. 7, it can be seen that the data sensed in each vertical pattern electrode is represented by four of the same data according to the divided regions. For example, four data sensed in each vertical pattern electrode may be separately displayed by the horizontal pattern data as illustrated in FIG. 7. That is, first vertical pattern data V1 may be divided into four regions by second horizontal pattern data H2, third horizontal pattern data H3, and fourth horizontal pattern data H4, second vertical pattern data V2 may be divided into four regions by the second horizontal pattern data H2, the third horizontal pattern data H3, and the fourth horizontal pattern data H4, third vertical pattern data V3 may be divided into four regions by the second horizontal pattern data H2, the third horizontal pattern data H3, and the fourth horizontal pattern data H4, and fourth vertical pattern data V4 may be divided into four regions by the second horizontal pattern data H2, the third horizontal pattern data H3, and the fourth horizontal pattern data H4. According to an exemplary embodiment, the first vertical pattern data V1 may be divided by a contiguous array and the first horizontal pattern data H1. According to an exemplary embodiment, each vertical pattern data divided by four regions may correspond to data of the vertical sub pattern.

Hereinafter, referring to FIGS. 8 and 9, a method for converting the data sensed for the first touch pattern (e.g., SNS touch pattern 620) illustrated in FIG. 7 above into data of the second touch pattern (e.g., normal touch pattern 610) will be described in detail.

Figure 8:
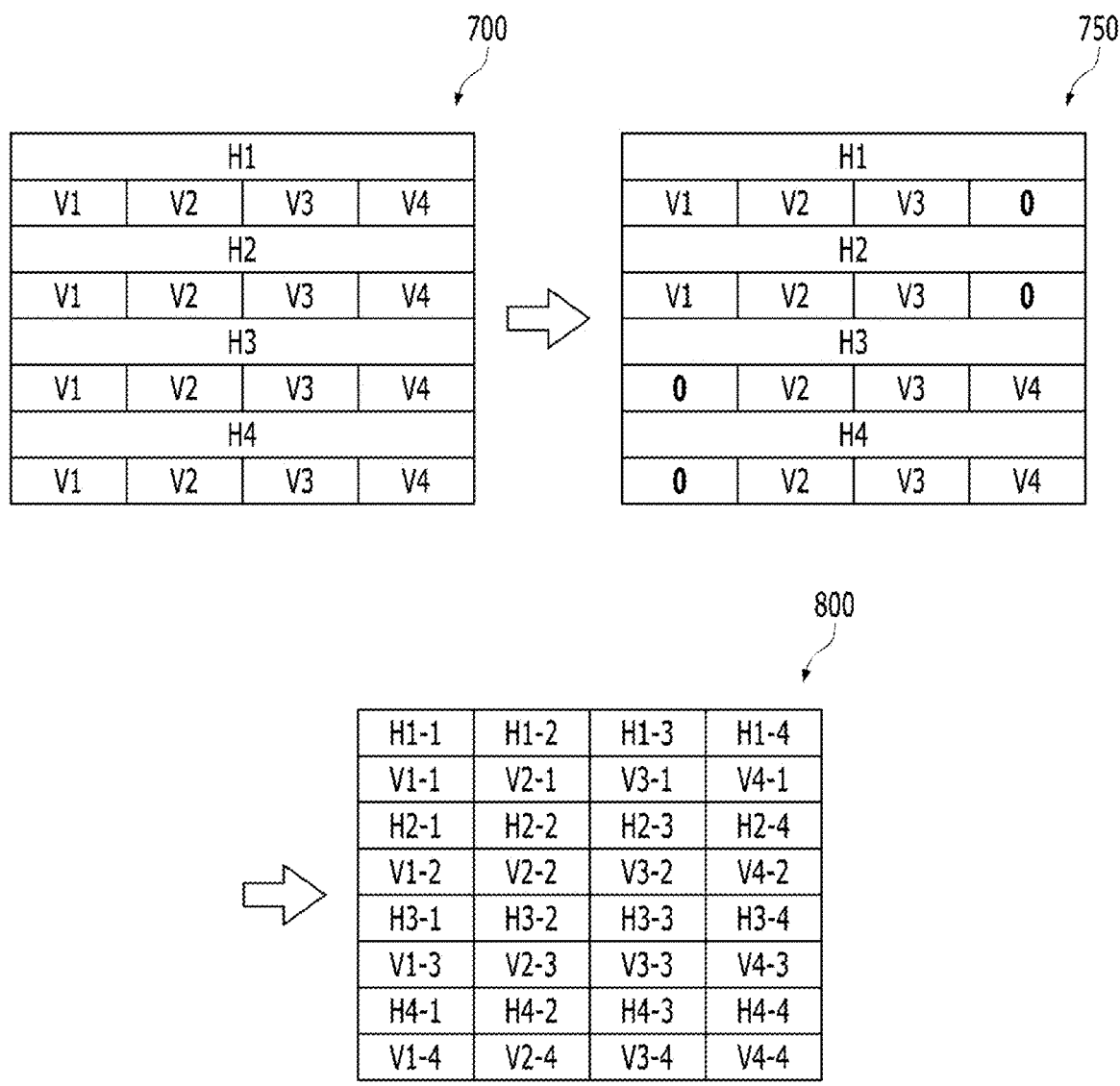
FIG. 8 is a diagram illustrating a data conversion relationship between the touch patterns according to an exemplary embodiment.

FIG. 8 is a diagram illustrating a data conversion relationship between the touch patterns according to an exemplary embodiment. Referring to FIG. 8, the sensing data 700 sensed for the first touch pattern (e.g., SNS touch pattern 620) may be converted into data 800 of the second touch pattern (e.g., normal touch pattern 610). However, according to the exemplary embodiment, when two diagonal touches are generated at the time of converting the first touch pattern into the second touch pattern, diagonal conversion type touch pattern data 750 may be first generated. For example, the diagonal conversion type touch pattern data 750 illustrated in FIG. 8 is a case where two touches are generated in a top left direction and a bottom right direction. That is, when it is judged that two touches are generated in the top left direction and the bottom right direction, values of first vertical pattern data in the top right direction and the bottom left direction which are opposite diagonal directions may be filled with '0', and then the first touch pattern data 700 may be converted into the second touch pattern data 800. Therefore, top data values divided by the first horizontal pattern data H1, the second horizontal pattern data H2, and the third horizontal pattern data H3 in the fourth vertical pattern data V4 are converted into '0' and a bottom data value divided by the third horizontal pattern data H3 and the fourth horizontal pattern data H4 in the first vertical pattern data V1 is converted into '0' to generate the diagonal conversion type touch pattern data 750 illustrated in FIG. 8.

Next, the diagonal conversion type touch pattern data 750 may be converted into the data 800 of the second touch pattern (e.g., normal touch pattern 610). For example, the first vertical pattern data V1 may be converted into 1-$1^{st}$ vertical sub pattern data V1-1, 1-$2^{nd}$ vertical sub pattern data V1-2, 1-$3^{rd}$ vertical sub pattern data V1-3, and 1-$4^{th}$ vertical sub pattern data V1-4. The second vertical pattern data V2 may be converted into 2-$1^{st}$ vertical sub pattern data V2-1, 2-$2^{nd}$ vertical sub pattern data V2-2, 2-$3^{rd}$ vertical sub pattern data V2-3, and 2-$4^{th}$ vertical sub pattern data V2-4. The third vertical pattern data V3 may be converted into 3-$1^{st}$ vertical sub pattern data V3-1, 3-$2^{nd}$ vertical sub pattern data V3-2, 3-$3^{rd}$ vertical sub pattern data V3-3, and 3-$4^{th}$ vertical sub pattern data V3-4. The fourth vertical pattern data V4 may be converted into 4-$1^{st}$ vertical sub pattern data V4-1, 4-$2^{nd}$ vertical sub pattern data V4-2, 4-$3^{rd}$ vertical sub pattern data V4-3, and 4-$4^{th}$ vertical sub pattern data V4-4.

Further, the first horizontal pattern data H1 may be converted into 1-$1^{st}$ horizontal sub pattern data H1-1, 1-$2^{nd}$ horizontal sub pattern data H1-2, 1-$3^{rd}$ horizontal sub pattern data H1-3, and 1-$4^{th}$ horizontal sub pattern data H1-4. The second horizontal pattern data H2 may be converted into 2-$1^{st}$ horizontal sub pattern data H2-1, 2-$2^{nd}$ horizontal sub pattern data H2-2, 2-$3^{rd}$ horizontal sub pattern data H2-3, and 2-$4^{th}$ horizontal sub pattern data H2-4. The third horizontal pattern data H3 may be converted into 3-$1^{st}$ horizontal sub pattern data H3-1, 3-$2^{nd}$ horizontal sub pattern data H3-2, 3-$3^{rd}$ horizontal sub pattern data H3-3, and 3-$4^{th}$ horizontal sub pattern data H3-4. The fourth horizontal pattern data H4 may be converted into 4-$1^{st}$ horizontal sub pattern data H4-1, 4-$2^{nd}$ horizontal sub pattern data H4-2, 4-$3^{rd}$ horizontal sub pattern data H4-3, and 4-$4^{th}$ horizontal sub pattern data H4-4.

Next, according to an exemplary embodiment, the touch sensing circuit 140 may determine data of each of the plurality of vertical sub patterns based on the sensing values V1, V2, V3, and V4 sensed by each vertical pattern electrode and the sensing value sensed by at least one horizontal pattern electrode adjacent to each vertical sub pattern of the plurality of vertical sub patterns corresponding to each vertical pattern electrode, for each vertical pattern electrode of the plurality of vertical pattern electrodes. A method for determining the data of the vertical sub pattern may be represented by <Equation 1> below, but is not limited thereto.

$$Vn-m = Vn \times (HM + H(m+1))/(H1 + H2 + H3 + H4) \quad \text{[Equation 1]}$$

According to an exemplary embodiment, referring to <Equation 1> above, the 1-$1^{st}$ vertical sub pattern data V1-1 of the first vertical pattern data V1 may be determined based on the first vertical pattern data V1 and the sensing values (i.e., H1 and H2) sensed by horizontal pattern electrodes (i.e., the first horizontal pattern electrode and the second horizontal pattern electrode) adjacent to the 1-$1^{st}$ vertical sub pattern. The 1-$2^{nd}$ vertical sub pattern data V1-2 of the first vertical pattern data V1 may be determined based on the first vertical pattern data V1 and the sensing values (i.e., H2 and H3) sensed by horizontal pattern electrodes (i.e., the second horizontal pattern electrode and the third horizontal pattern electrode) adjacent to the 1-$2^{nd}$ vertical sub pattern. The 1-$3^{rd}$ vertical sub pattern data V1-3 of the first vertical pattern data V1 may be determined based on the first vertical pattern data V1 and the sensing values (i.e., H3 and H4) sensed by horizontal pattern electrodes (i.e., the third horizontal pattern electrode and the fourth horizontal pattern electrode) adjacent to the 1-$3^{rd}$ vertical sub pattern. The 1-$4^{th}$ vertical sub pattern data V1-4 of the first vertical pattern data V1 may be determined based on the first vertical pattern data V1 and the sensing values (i.e., H4 and H1 of an adjacent array) sensed by horizontal pattern electrodes (i.e., the fourth horizontal pattern electrode and the first horizontal pattern electrode of the adjacent array) adjacent to the 1-$4^{th}$ vertical sub pattern. Each vertical sub pattern data of the second vertical pattern data V2, the third vertical pattern data V3, and the fourth vertical pattern data V4 may also be determined by the same or similar method.

According to an exemplary embodiment, the touch sensing circuit 140 may determine data of each of the plurality of horizontal sub patterns based on the sensing values H1, H2, H3, and H4 sensed by each horizontal pattern electrode and at least one vertical sub pattern data adjacent to each horizontal sub pattern of the plurality of horizontal sub patterns corresponding to each horizontal pattern electrode, for each horizontal pattern electrode of the plurality of horizontal pattern electrodes. A method for determining the data of the horizontal sub pattern may be represented by <Equation 2> below, but is not limited thereto.

$$Hn - m = Hn \times \frac{Vm - (n-1) + Vm - n}{(Vsum) \times 1.5} \quad \text{[Equation 2]}$$

In <Equation 2> above, Vsum may be defined as in <Equation 3> below.

$$Vsum = V1-n + V2-n + V3-n + V4-n + V1-(n-1) + V2-(n-1) + V3-(n-1) + V4-(n-1) \quad \text{[Equation 3]}$$

According to an exemplary embodiment, referring to <Equation 2> and <Equation 3> above, the 2-$1^{st}$ horizontal sub pattern data H2-1 of the second horizontal pattern data H2 may be determined based on the second horizontal pattern data H2 and vertical sub pattern data (i.e., the 1-$1^{st}$ vertical sub pattern data V1-1 and the 1-$2^{nd}$ vertical sub pattern data V1-2) adjacent to the 2-$1^{st}$ horizontal sub pattern. The 2-$2^{nd}$ horizontal sub pattern data H2-2 of the second horizontal pattern data H2 may be determined based on the second horizontal pattern data H2 and vertical sub pattern data (i.e., the 2-$1^{st}$ vertical sub pattern data V2-1 and the 2-$2^{nd}$ vertical sub pattern data V2-2) adjacent to the 2-$2^{nd}$ horizontal sub pattern. The 2-$3^{rd}$ horizontal sub pattern data H2-3 of the second horizontal pattern data H2 may be determined based on the second horizontal pattern data H2 and vertical sub pattern data (i.e., the 3-$1^{st}$ vertical sub pattern data V3-1 and the 3-2$^{nd}$ vertical sub pattern data V3-2) adjacent to the 2-3$^{rd}$ horizontal sub pattern. The 2-4$^{th}$ horizontal sub pattern data H2-4 of the second horizontal pattern data H2 may be determined based on the second horizontal pattern data H2 and vertical sub pattern data (i.e., the 4-1$^{st}$ vertical sub pattern data V4-1 and the 4-2$^{nd}$ vertical sub pattern data V4-2) adjacent to the 2-4$^{th}$ horizontal sub pattern. Each horizontal sub pattern data of the first horizontal pattern data H1, the third horizontal pattern data H3, and the fourth horizontal pattern data H4 may also be determined by the same or similar method.

Figure 10A:
Figure 10B:
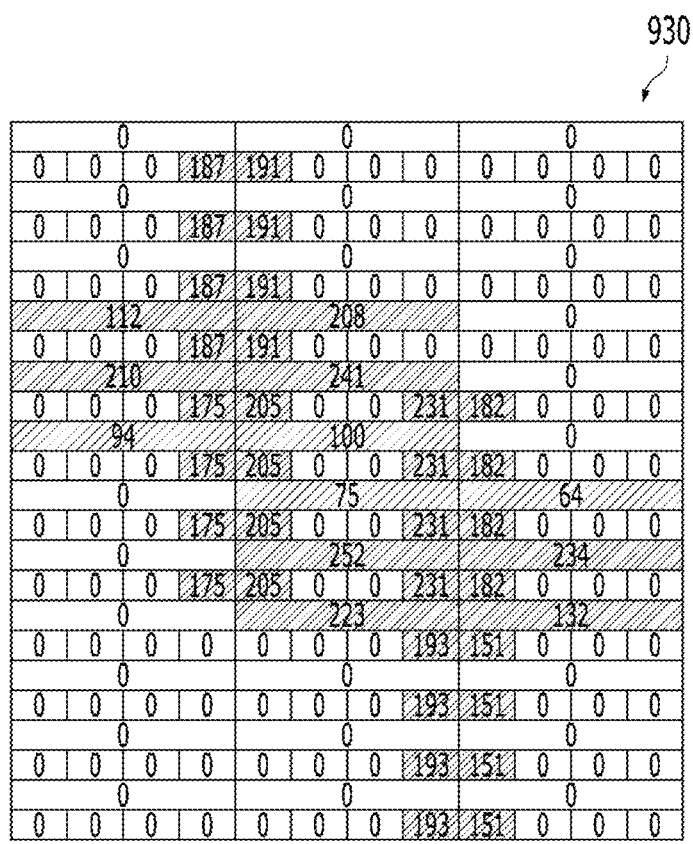
Figure 10C:
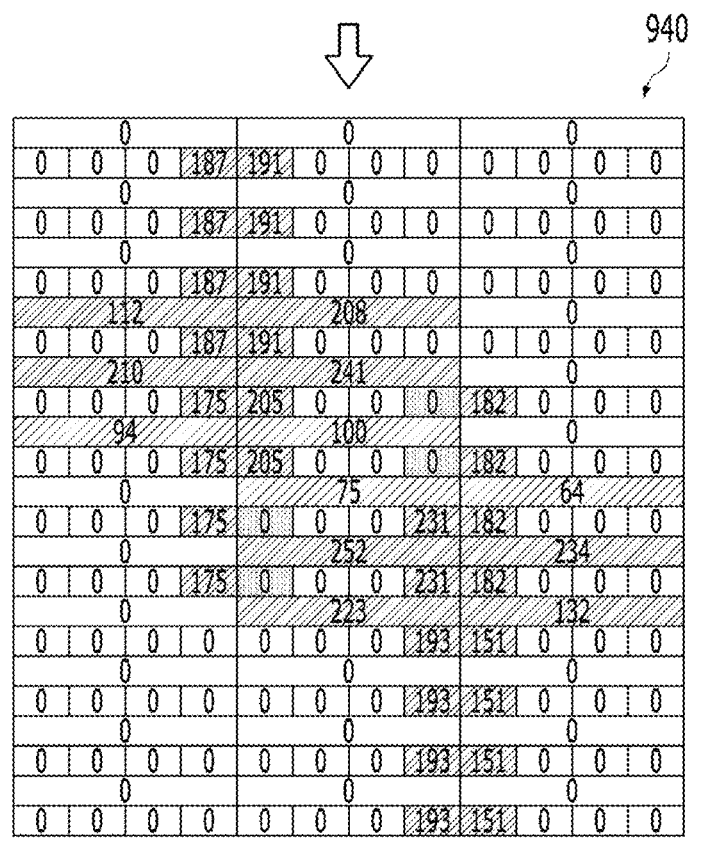
Figure 10D:
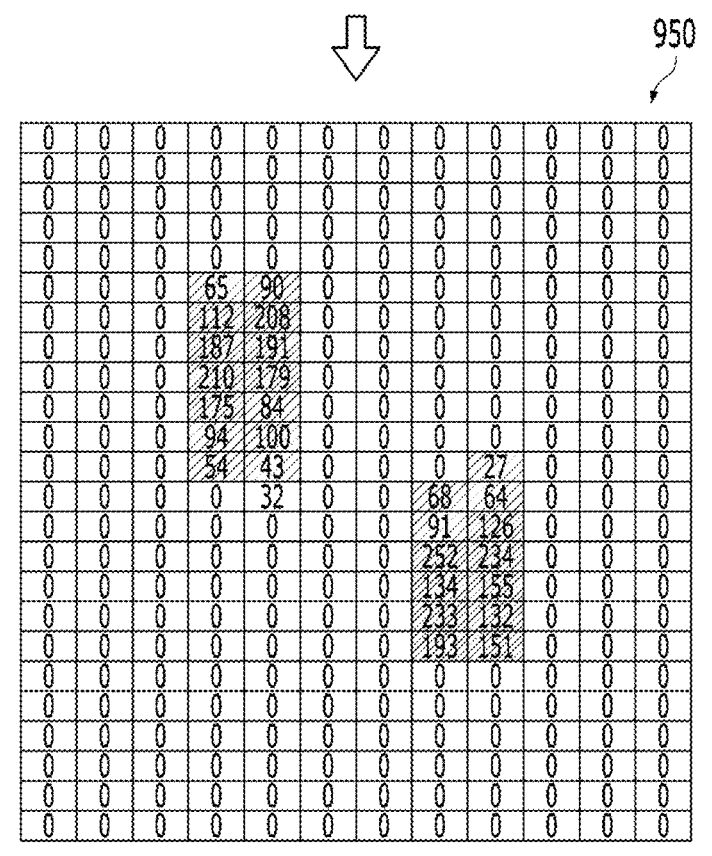

Hereinafter, an exemplary embodiment of converting data by the method will be described with reference to FIGS. 9 and 10.

Here, FIG. 9 illustrates a unit array constituted by 9 (3*3). One array is constituted by four vertical pattern electrodes and four horizontal pattern electrodes. For convenience, each array is described as the coordinates in FIG. 9 or below, so an array constituting a top left side constituting coordinate (1, 1) positioned at a first column among three arrays constituting a first row will be referred to as array a. Further, an array constituting coordinate (1, 2) positioned in a second column among three arrays constituting the first row will be referred to as array b. Further, an array constituting coordinate (1, 3) positioned in a third column among three arrays constituting the first row will be referred to as array c.

Likewise, an array constituting coordinate (2, 1) positioned in the first column among three arrays constituting a second row will be referred to as array d. Further, an array constituting coordinate (2, 2) positioned in the second column among three arrays constituting the second row will be referred to as array e. Further, an array constituting coordinate (2, 3) positioned in the third column among three arrays constituting the second row will be referred to as array f.

Likewise, an array constituting coordinate (3, 1) positioned in the first column among three arrays constituting a third row will be referred to as array g. Further, an array constituting coordinate (3, 2) positioned in the second column among three arrays constituting the third row will be referred to as array h. Further, an array constituting coordinate (3, 3) positioned in the third column among three arrays constituting the third row will be referred to as array i.

That is, FIG. 9 illustrates 9 arrays constituted by arrays a to i, and a value of sensing data 900 sensed for the first touch pattern (e.g., SNS touch pattern 620) is granted to each array.

As an example, further, the sensing data 900 sensed from the first touch pattern 620 sensed in array a illustrated in FIG. 9 may be represented by four vertical pattern data (e.g., a_V1, a_V2, a_V3, and a_V4) and four horizontal pattern data (e.g., a_H1, a_H2, a_H3, and a_H4). Further, the sensing data 900 sensed from the first touch pattern 620 sensed in array b may be represented by four vertical pattern data (e.g., b_V1, b_V2, b_V3, and b_V4) and four horizontal pattern data (e.g., b_H1, b_H2, b_H3, and b_H4). Further, the sensing data 900 sensed from the first touch pattern 620 sensed in array c may be represented by four vertical pattern data (e.g., c_V1, c_V2, c_V3, and c_V4) and four horizontal pattern data (e.g., c_H1, c_H2, c_H3, and c_H4). Further, the sensing data 900 sensed from the first touch pattern 620 sensed in array d may be represented by four vertical pattern data (e.g., d_V1, d_V2, d_V3, and d_V4) and four horizontal pattern data (e.g., d_H1, d_H2, d_H3, and d_H4). Further, the sensing data 900 sensed from the first touch pattern 620 sensed in array e may be represented by four vertical pattern data (e.g., e_V1, e_V2, e_V3, and e_V4) and four horizontal pattern data (e.g., e_H1, e_H2, e_H3, and e_H4). Further, the sensing data 900 sensed from the first touch pattern 620 sensed in array f may be represented by four vertical pattern data (e.g., f_V1, f_V2, f_V3, and f_V4) and four horizontal pattern data (e.g., f_H1, f_H2, f_H3, and f_H4). Further, the sensing data 900 sensed from the first touch pattern 620 sensed in array g may be represented by four vertical pattern data (e.g., g_V1, g_V2, g_V3, and g_V4) and four horizontal pattern data (e.g., g_H1, g_H2, g_H3, and g_H4). Further, the sensing data 900 sensed from the first touch pattern 620 sensed in array h may be represented by four vertical pattern data (e.g., h_V1, h_V2, h_V3, and h_V4) and four horizontal pattern data (e.g., h_H1, h_H2, h_H3, and h_H4). Further, the sensing data 900 sensed from the first touch pattern 620 sensed in array i may be represented by four vertical pattern data (e.g., i_V1, i_V2, i_V3, and i_V4) and four horizontal pattern data (e.g., i_H1, i_H2, i_H3, and i_H4).

FIGS. 10A to 10D are diagrams illustrating the data conversion process between the touch patterns according to an exemplary embodiment.

Referring to FIGS. 10A to 10D, the data 910 (e.g., raw data) sensed through 9 unit arrays constituted by four vertical pattern electrodes and four horizontal pattern electrodes may be computed with base data 920. For example, the base data 920 may correspond to the base sensing value corresponding to the base capacitance Ce described above in FIG. 4. With respect to the sensed data 910 in FIGS. 10A to 10D, data a_V4 sensed in the fourth vertical pattern electrode of array a is verified as 2198, data b_V1 sensed in the first vertical pattern electrode of array b is verified as 2203, data d_V4 sensed in the fourth vertical pattern electrode of array d is verified as 2188, and data e_V1 sensed in the first vertical pattern electrode of array e is verified as 2217. Further, data a_H4 sensed in the fourth horizontal pattern electrode of array a is verified as 2120, data d_H1 sensed in the first horizontal pattern electrode of array d is verified as 2215, data d_H2 sensed in the second horizontal pattern electrode of array d is verified as 2104, data b_H4 sensed in the fourth horizontal pattern electrode of array b is verified as 2215, data e_H1 sensed in the first horizontal pattern electrode of array e is verified as 2251, and data e_H2 sensed in the second horizontal pattern electrode of array e is verified as 2109. That is, when a location where the value is changed compared with the base data 920 is considered, it may be assumed that the touch occurs around point A.

Further, with respect to the sensed data 910 in FIGS. 10A to 10D, data e_V4 sensed in the fourth vertical pattern electrode of array e is verified as 2009, data f_V1 sensed in the first vertical pattern electrode of array f is verified as 2193, data h_V4 sensed in the fourth vertical pattern electrode of array h is verified as 2204, and data i_V1 sensed in the first vertical pattern electrode of array i is verified as 2162. Further, data e_H3 sensed in the third horizontal pattern electrode of array e is verified as 2083, data e_H4 sensed in the fourth horizontal pattern electrode of array e is verified as 2262, data h_H1 sensed in the first horizontal pattern electrode of array h is verified as 2233, data f_H3 sensed in the third horizontal pattern electrode of array f is verified as 2074, data f_H4 sensed in the fourth horizontal pattern electrode of array f is verified as 2242, and data i_H1 sensed in the first horizontal pattern electrode of array i is verified as 2140. That is, when a location where the value is changed compared with the base data 920 is considered, it may be assumed that the touch occurs around point B.

That is, it may be verified that two touches occur around diagonal directions of the top left side and the bottom right side of array e of points A and B.

Hereinafter, a data conversion process when two touches occur around the diagonal direction of array e will be described below with reference to FIGS. 10A to 10D.

Further, referring to FIGS. 10A to 10D, in the base data 920, base data for the fourth vertical pattern of array a is verified as 2011, base data for the first vertical pattern of array b is verified as 2012, base data for the fourth vertical pattern of array d is verified as 2013, and base data for the first vertical pattern of array e is verified as 2012. Further, base data for the fourth horizontal pattern electrode of array a is verified as 2008, base data for the first horizontal pattern electrode of array d is verified as 2004, base data for the second horizontal pattern electrode of array d is verified as 2010, base data for the fourth horizontal pattern electrode of array b is verified as 2007, base data for the first horizontal pattern electrode of array e is verified as 2010, and base data for the second horizontal pattern electrode of array e is verified as 2009.

Further, referring to FIGS. 10A to 10D, in the base data 920, base data for the fourth vertical pattern of array c is verified as 2011, base data for the first vertical pattern of array f is verified as 2011, base data for the fourth vertical pattern of array his verified as 2011, and base data for the first vertical pattern of array i is verified as 2011. Further, base data for the third horizontal pattern electrode of array c is verified as 2012, base data for the fourth horizontal pattern electrode of array e is verified as 2010, base data for the first horizontal pattern electrode of array h is verified as 2013, base data for the third horizontal pattern electrode of array f is verified as 2009, base data for the fourth horizontal pattern electrode of array f is verified as 2010, and base data for the first horizontal pattern electrode of array i is verified as 2008.

According to an exemplary embodiment, when a difference between the sensed data 910 and the base data 920 is calculated, delta data 930 may be calculated. For example, with respect to the delta data 930 in FIGS. 10A to 10D, delta data for the fourth vertical pattern electrode of array a is calculated as 187, delta data for the first vertical pattern electrode of array b is calculated as 191, delta data for the fourth vertical pattern electrode of array d is calculated as 175, and delta data for the first vertical pattern electrode of array e is calculated as 205. Further, delta data for the fourth horizontal pattern electrode of array a is verified as 112, delta data for the fourth horizontal pattern electrode of array b is verified as 208, delta data for the first horizontal pattern electrode of array d is verified as 210, delta data for the second horizontal pattern electrode of array d is verified as 94, delta data for the fourth horizontal pattern electrode of array b is verified as 208, delta data for the first horizontal pattern electrode of array e is verified as 241, and delta data for the second horizontal pattern electrode of array e is verified as 100.

Further, with respect to the delta data 930 in FIGS. 10A to 10D, delta data for the fourth vertical pattern electrode of array e is calculated as 231, delta data for the first vertical pattern electrode of array f is calculated as 182, delta data for the fourth vertical pattern electrode of array h is calculated as 193, and delta data for the first vertical pattern electrode of array i is calculated as 151. Further, delta data for the third horizontal pattern electrode of array e is verified as 75, delta data for the fourth horizontal pattern electrode of array e is verified as 252, delta data for the first horizontal pattern electrode of array h is verified as 223, delta data for the third horizontal pattern electrode of array f is verified as 64, delta data for the fourth horizontal pattern electrode of array f is verified as 234, and delta data for the first horizontal pattern electrode of array i is verified as 132.

According to an exemplary embodiment, the delta data 930 may be converted into data 950 corresponding to the second touch pattern (e.g., normal touch pattern) in FIG. 9 by the data conversion in FIG. 8.

Figure 11:
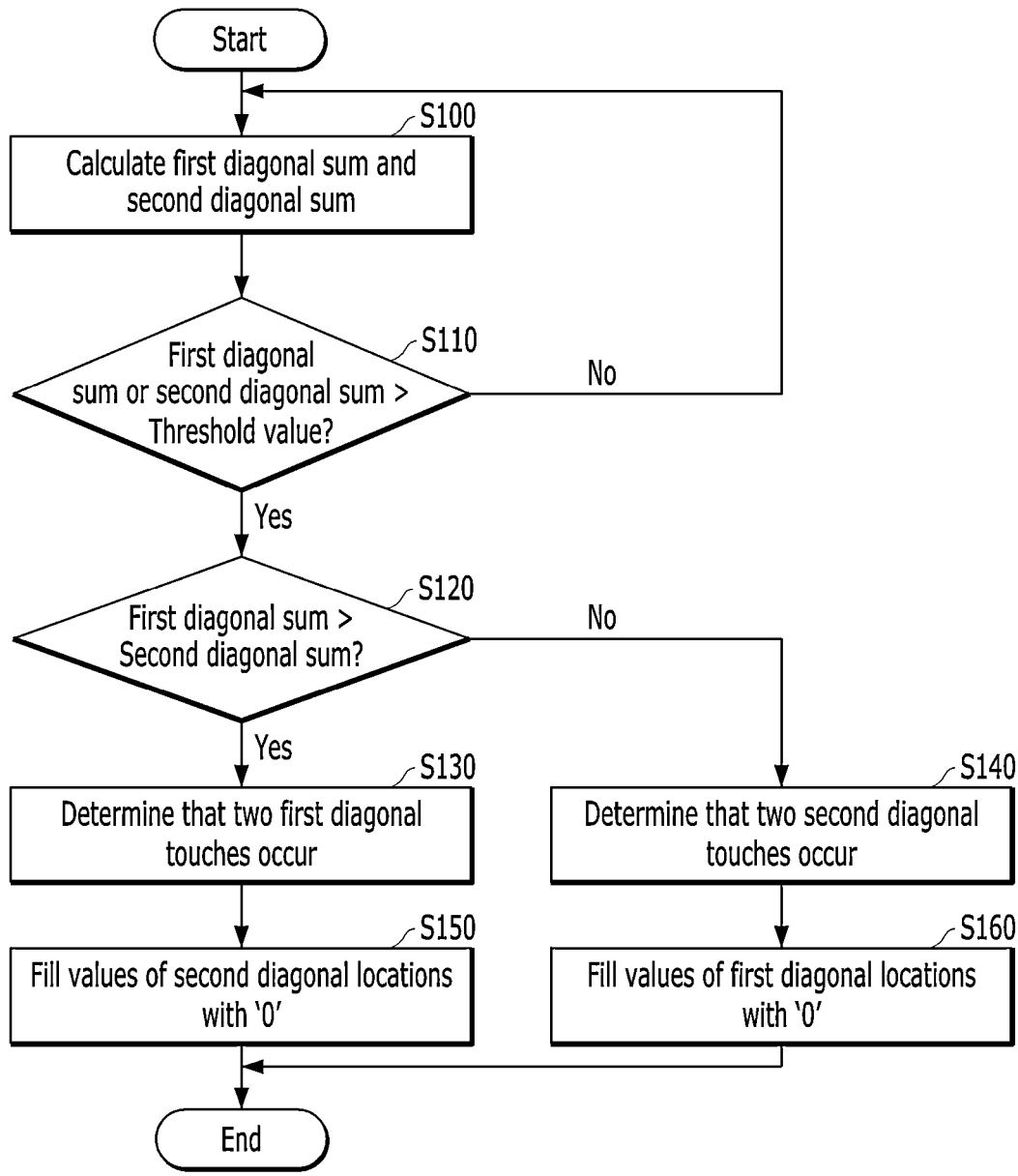
FIG. 11 is a flowchart showing a second touch judgment operation according to an exemplary embodiment.

However, according to FIGS. 11 and 12, when it is judged that two diagonal touches occur, the diagonal conversion type touch pattern data 940 is first generated before being converted into the data 950 corresponding to the second touch pattern (e.g., normal touch pattern).

First, FIG. 11 is a flowchart for describing a method for judging whether two diagonal touches occur.

First, a first diagonal sum and a second diagonal sum are calculated (S100). Here, the first diagonal sum means a sum of a top left pattern electrode value and a bottom right pattern electrode value and the second diagonal sum means a sum of a top right pattern electrode value and a bottom left pattern electrode value.

Specifically, in the array of FIG. 9, the top left pattern electrode value, the bottom right pattern electrode value, the top right pattern electrode value, and the bottom left pattern electrode value may be calculated based on the following equations.

Top left pattern electrode value (Left-Top Value): $a\_H4+a\_V4+b\_V1+d\_H1$

Bottom right pattern electrode value (Right-Bottom Value): $h\_V4+i\_H1+i\_V1+f\_H4$ Top right pattern electrode value (Right-Top Value): $b\_V4+c\_H4+c\_V1+f\_H1$ Bottom left pattern electrode value (Left-Bottom Value): $d\_H4+g\_H1+g\_V4+h\_V1$ Therefore, the top left pattern electrode value, the bottom right pattern electrode value, the top right pattern electrode value, and the bottom left pattern electrode value calculated from the data 910 of the first touch pattern of FIGS. 10A to 10D are as follows.

Top left pattern electrode value (Left-Top Value) : 2120+2198+2203+2215=8736

Bottom right pattern electrode value (Right-Bottom Value) : 2204+2140+2162+2242=8748

Top right pattern electrode value (Right-Top Value): 2011+2005++2012+2012=8040

Bottom left pattern electrode value (Left-Bottom Value): 2008+2010+2009+2011=8038

Therefore, the first diagonal sum and the second diagonal sum may be calculated as follows.

First diagonal sum: 8736+8748=17484

Second diagonal sum: 8269+8040=16078

In FIG. 11, when the first diagonal sum or the second diagonal sum is greater than a predetermined threshold value (S110), it may be judged that two diagonal touches occur in one direction of the first diagonal direction or the second diagonal direction.

As an example, when the first diagonal sum (17484) and the second diagonal sum (16078) are compared with each other from the data 910 of the first touch pattern, the first diagonal sum has a large value, so it may be verified that two first diagonal touches occur.

For example, when the first diagonal sum is greater than the second diagonal sum (Yes in S120), it is judged that two first diagonal touches occur (S130), and as a result, the diagonal conversion type touch pattern data 940 in which a second diagonal location is filled with '0' is first generated (S150).

Unlike this, when the second diagonal sum is greater than the first diagonal sum (No in S120), it is judged that two second diagonal touches occur (S140), and as a result, the diagonal conversion type touch pattern data 940 in which a first diagonal location is filled with '0' is first generated (S160).

Therefore, the top right pattern electrode value and the bottom left pattern electrode value are filled with '0' in the diagonal conversion type touch pattern data 940 of FIGS. 10A to 10D.

That is, a first touch electrode value acquired by adding sensing values sensed by a plurality of horizontal pattern electrodes close to the first touch and sensing value sensed by a plurality of vertical pattern electrodes, and a second touch electrode value acquired by adding sensing values sensed by a plurality of horizontal pattern electrodes close to the second touch, and sensing values sensed by a plurality of vertical pattern electrodes are calculated, and when the first touch electrode value and the second touch electrode value are greater than a predetermined threshold value, it is determined that two diagonal touches occur.

Next, data of each of a plurality of vertical sub patterns close to a first diagonal point positioned in the same row as the first touch and positioned in the same column as the second touch is substituted with 0, and data of each of a plurality of vertical sub patterns close to a second diagonal point positioned in the same column as the first touch and positioned in the same row as the second touch is substituted with 0.

Thereafter, the converted diagonal conversion type touch pattern data 940 is converted into the data 950 corresponding to the second touch pattern according to FIG. 8 described above.

Figure 12A:
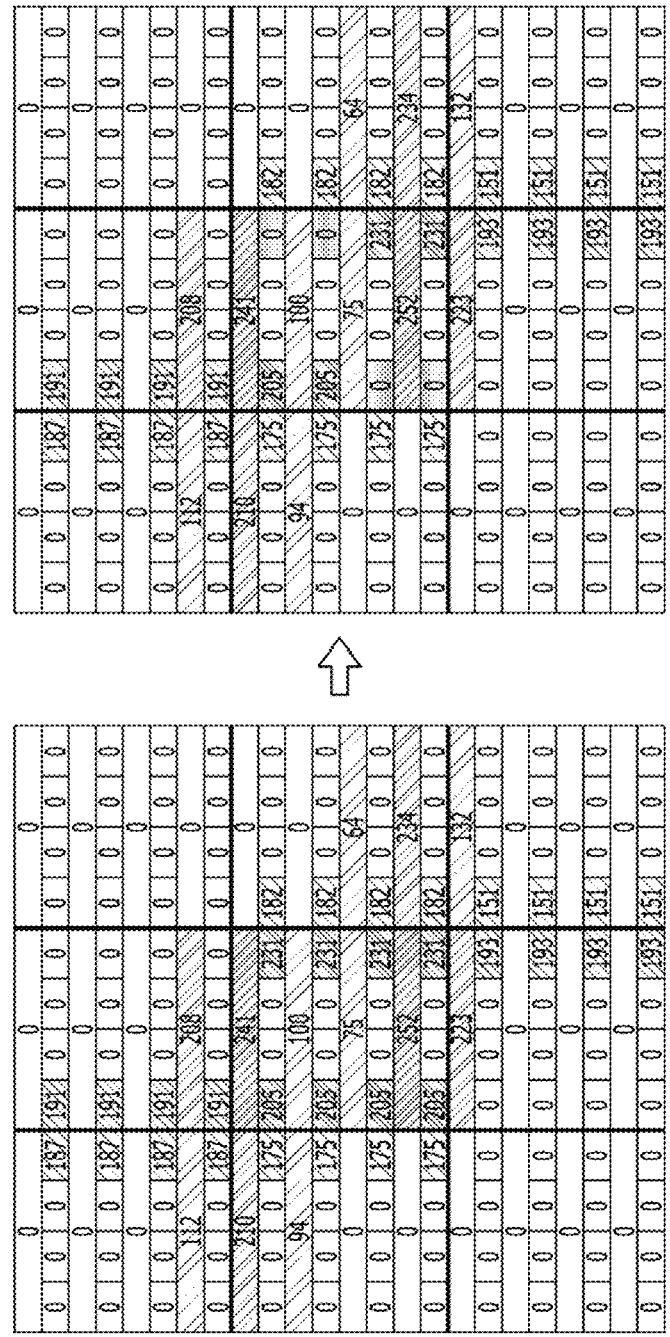
Figure 12B:
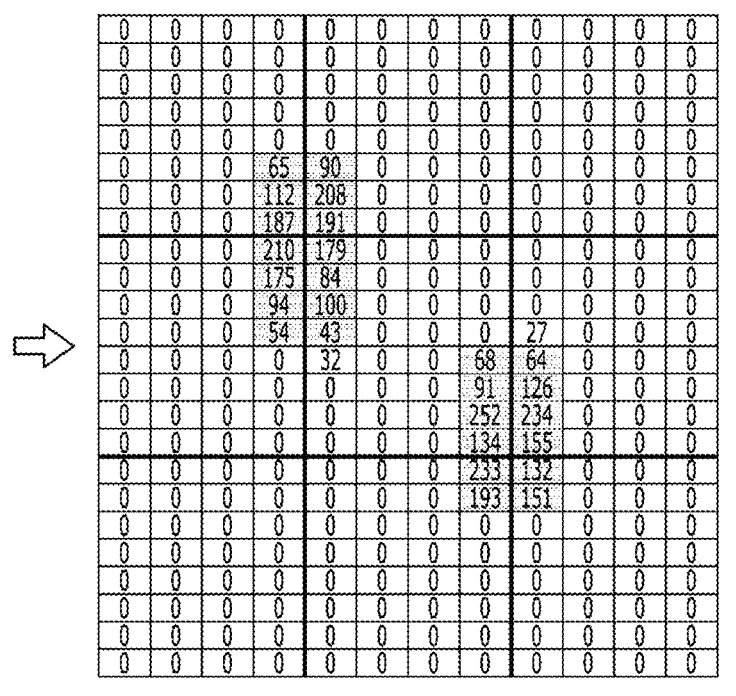

FIGS. 12A and 12B are diagrams illustrating the data conversion process between the touch patterns according to an exemplary embodiment. Referring to FIG. 12A, the data of the plurality of vertical sub patterns and the data of the horizontal sub patterns are calculated by applying <Equation 1> to <Equation 3> described above in the delta data illustrated on the left side. In this case, in FIG. 12A, the data corresponding to the second touch pattern (e.g., normal touch pattern) is finally calculated without applying whether it is judged that two diagonal touches occur in FIGS. 10A to 10D and 11, and it can be seen that noise (ghost touch) occurs at bottom left and top right points other than top left and bottom right points where two touches actually occur.

However, in FIG. 12B, the data corresponding to the second touch pattern (e.g. normal touch pattern) is finally calculated by applying whether it is judged whether two diagonal touches occur, and it may be verified that the touch is sensed only at the top left and bottom right points where two touches actually occur.

According to FIGS. 8 to 11 described above, when the data of the vertical sub patterns and the data of the horizontal sub patterns are calculated, the touch sensing circuit 140 may identify the touch coordinates based on the calculated data. For example, as described above in FIG. 5, the touch sensing circuit 140 may calculate the touch coordinates by inputting various sensing values verified along a predetermined line into a specific model or algorithm. That is, since the data of the vertical sub patterns and the data of the horizontal sub patterns calculated according to FIG. 12B above have the matrix form described in FIG. 5, a touch coordinate calculation algorithm applied to the existing matrix form may be applied in the same or similar scheme.

Figure 13:
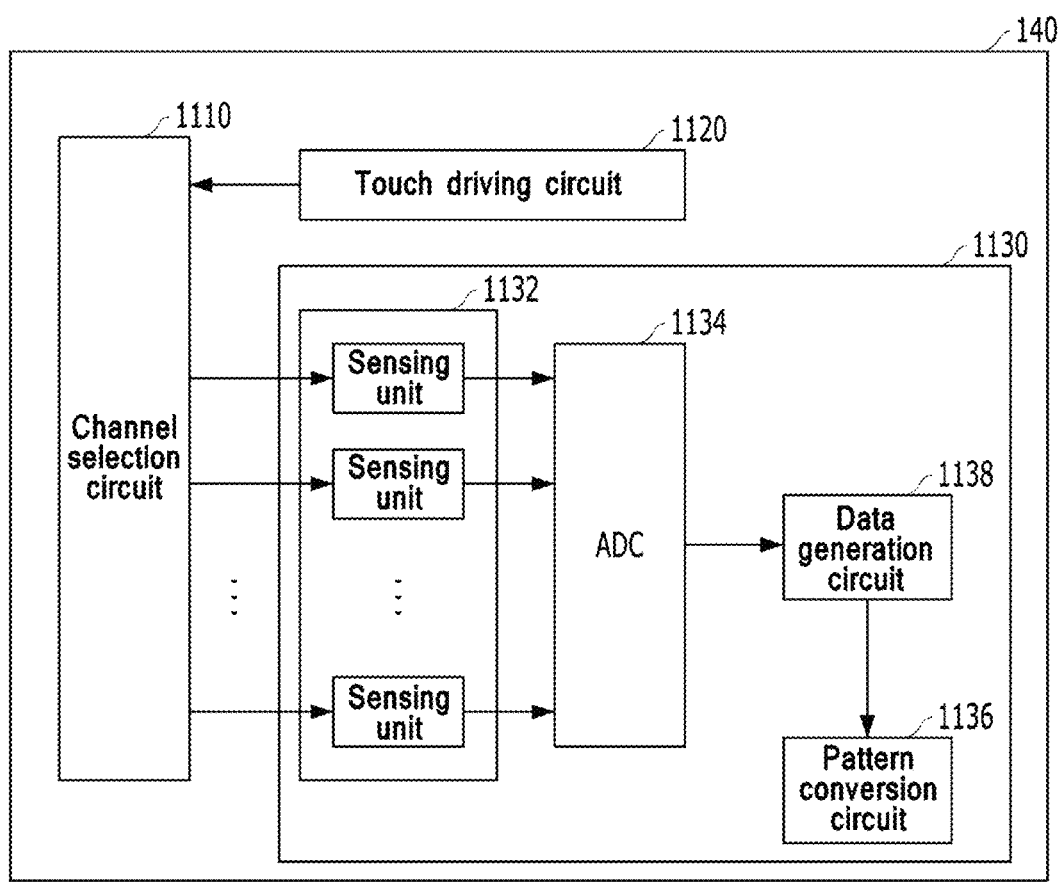
FIG. 13 is a configuration diagram of the touch sensing circuit according to an exemplary embodiment.

FIG. 13 is a configuration diagram of the touch sensing circuit according to an exemplary embodiment. Referring to FIG. 13, the touch sensing circuit 140 includes a channel selection circuit 1110, a touch driving circuit 1120, and a data processing circuit 1130. The channel selection circuit 1110 is connected to a plurality of touch electrodes through a plurality of touch lines one to one. The channel selection circuit 1110 supplies an uplink signal supplied from the touch driving circuit 1120 to the touch electrode during a first touch sensing period, and supplies a touch driving signal supplied from the touch driving circuit 1120 to the touch electrode during a third touch sensing period.

Further, the channel selection circuit 1110 connects the touch lines to the data processing circuit 1130 during the second touch sensing period and the third touch sensing period in order to sense a capacitance generated by an active pen touch or a finger touch. To this end, the channel selection circuit 1110 may include a plurality of multiplexers (not illustrated) that are switched according to a touch synchronization signal and a channel selection signal, and selectively connect the plurality of touch lines to the data processing circuit 1130.

Meanwhile, the channel selection circuit 1110 may supply common voltage to the plurality of touch electrodes through the plurality of touch lines, respectively, during a display interval of the touch synchronization signal. The touch driving circuit 1120 generates the uplink signal or the touch driving signal, and supplies the generated uplink signal or touch driving signal to the touch electrode TE through each of the touch lines connected to the channel selection circuit 1110. Specifically, the touch driving circuit 1120 generates the uplink signal during the first touch sensing period in a first frame period and supplies the generated uplink signal to the touch electrode through each of the touch lines, and generates the touch driving signal during a plurality of third touch sensing periods in the first frame period and supplies the generated touch driving signal to the touch electrode through each of the touch lines. In this case, the uplink signal may include panel information of the panel 120, a protocol version, or a synchronization signal.

In an exemplary embodiment, the touch driving circuit 1120 may generate the uplink signal or the touch driving signal by using a driving signal having a plurality of driving pulses swung between high voltage and low voltage based on reference common voltage. Meanwhile, the touch driving circuit 1120 may supply the common voltage to each of the plurality of touch electrodes through the plurality of touch lines, respectively, during the display interval of the touch synchronization signal. In FIG. 11, it is described that the touch driving circuit 1120 directly inputs the uplink signal or the touch driving signal into the channel selection circuit 1110, but in a modified exemplary embodiment, the touch driving circuit 1120 may input the uplink signal or the touch driving signal into the channel selection circuit 1110 through the data processing circuit 1130.

Further, the data processing circuit 1130 generates second sensing data by using sensing the finger touch during the third touch sensing period, and determines coordinates by the finger touch by using the generated second sensing data. In order to implement the function, the data processing circuit 1130 according to the present disclosure includes a plurality of sensing units 1132, an analog-digital converter (ADC) 1134, a pattern conversion circuit 1136, and a data generation circuit 1138.

According to an exemplary embodiment, the data generation circuit 1138 may generate data 910 and 930 of a first touch pattern (e.g., SNS touch pattern). The pattern conversion circuit 1136 may convert the data 910 of the first touch pattern into the data 950 of the second touch pattern.

The touch sensing circuit 140 may identify the touch coordinates or whether the touch occurs based on the converted data 950 of the second touch pattern.

As described above, according to the exemplary embodiment, even if the pattern of the touch electrode is changed, the data conversion process may make an accurate coordinate judgment such as the pattern of the existing touch electrode. In addition, according to the exemplary embodiment, sensing data of a matrix pattern can be acquired from sensing values sensed for a plurality of vertical pattern electrodes and a plurality of horizontal pattern electrodes. In addition, according to the exemplary embodiment, a relatively smaller number of touch electrodes are arranged for the same area, but more data is generated to judge touch coordinates more precisely and accurately.

Meanwhile, by the panel according to the exemplary embodiment, the number of channels for driving the touch electrode may be reduced to a level of 1/2. In addition, the size of an integrated circuit driving the touch electrode may be reduced with the reduction of the number of channels, and cost required for manufacturing the integrated circuit may also be reduced.

In the above-described contents, for convenience of description, an example (so called finger touch scheme) in which the external object touching the panel is the finger is primarily described, but the exemplary embodiment is not limited thereto, and the exemplary embodiment may also be applied to the active (stylus) pen touch scheme.

What is claimed is:

1. A touch sensing apparatus comprising a touch sensing circuit identifying touch coordinates based on sensing values of electrodes in a first direction and sensing values of electrodes in a second direction intersecting with the first direction, wherein the touch sensing circuit calculates a first touch electrode value by summing up sensing values of first-direction electrodes and second-direction electrodes, which are close to a first touch and calculates a second touch electrode value by summing up sensing values of first-direction electrodes and second-direction electrodes, which are close to a second touch; and determines that two touches occur in a diagonal direction when a sum of the first touch electrode value and the second touch electrode value is greater than a predetermined threshold value.

2. The touch sensing apparatus of claim 1, wherein each of the first-direction electrodes comprises a plurality of first-direction sub patterns, and each of the second-direction electrodes comprises a plurality of second-direction sub patterns, and the touch sensing circuit substitutes with 0 data of each of a plurality of first-direction sub patterns close to a first diagonal point positioned in the same row as the first touch and positioned in the same column as the second touch and substitutes with 0 data of each of a plurality of first-direction sub patterns close to a second diagonal point positioned in the same column as the first touch and positioned in the same row as the second touch; and identifies touch coordinates based on the data of each of the plurality of first-direction sub patterns including the substituted data of each of the plurality of first-direction sub patterns and the data of each of the plurality of second-direction sub patterns.

3. The touch sensing apparatus of claim 2, wherein, for each first-direction electrode, the touch sensing circuit determines data of each of the plurality of first-direction sub patterns based on a sensing value sensed by each first-direction electrode and a sensing value sensed by at least one second-direction electrode adjacent to each of the plurality of first-direction sub patterns corresponding to each first-direction electrode.

4. The touch sensing apparatus of claim 3, wherein, for each second-direction electrode, the touch sensing circuit determines data of each of the plurality of second-direction sub patterns based on a sensing value sensed by each second-direction electrode and data of at least one first-direction sub pattern adjacent to each of the plurality of second-direction sub patterns corresponding to each second-direction electrode.

5. The touch sensing apparatus of claim 4, wherein the touch sensing circuit calculates delta data, which is a difference between base data and the sensing values of the first-direction electrodes and the sensing values of the second-direction electrodes, substitutes with 0 data of each of a plurality of first-direction sub patterns, close to the first diagonal point and the second diagonal point, in the calculated delta data when the sum of the first touch electrode value and the second touch electrode value is greater than the predetermined threshold value, and identifies the touch coordinates based on the delta data including the data of each of the plurality of first-direction sub patterns close to the first diagonal point and the second diagonal point, which is substituted with 0.

6. The touch sensing apparatus of claim 2, wherein the touch sensing circuit determines the data of each second-direction sub pattern further based on data of the plurality of first-direction sub patterns adjacent to the second-direction electrode corresponding to each second-direction sub pattern.

7. The touch sensing apparatus of claim 2, wherein each first-direction electrode is disposed on a panel by being divided into the plurality of first-direction sub patterns and the plurality of first-direction sub patterns are connected by one touch driving line.

8. The touch sensing apparatus of claim 2, wherein the data of each of the plurality of first-direction sub patterns is determined based on a sensing value sensed by a second-direction electrode adjacent to an upper portion of each first-direction sub pattern and a sensing value sensed by a second-direction electrode adjacent to a lower portion of each first-direction sub pattern.

9. The touch sensing apparatus of claim 2, wherein the data of each of the plurality of second-direction sub patterns is determined based on data of the first-direction sub pattern adjacent to an upper portion of each second-direction sub pattern and data of the first-direction sub pattern adjacent to a lower portion of each second-direction sub pattern.

10. The touch sensing apparatus of claim 1, wherein data of N*M*2 sub patterns are generated from sensing values sensed by N (N is a natural number) first-direction electrodes and M (M is the natural number) second-direction electrodes.

11. The touch sensing apparatus of claim 10, wherein the sub patterns form a matrix composed of M*2 rows and N columns.

12. A touch sensing method comprising: receiving sensing values sensed by a plurality of first-direction pattern electrodes and a plurality of second-direction pattern electrodes disposed in a panel; calculating a first touch electrode value by summing up sensing values sensed by a plurality of second-direction pattern electrodes and sensing values sensed by a plurality of first-direction pattern electrodes, which are close to a first touch, and a second touch electrode value by summing up sensing values sensed by a plurality of second-direction pattern electrodes and sensing values sensed by a plurality of first-direction pattern electrodes, which are close to a second touch; and determining that two touches occur in a diagonal direction when a sum of the first touch electrode value and the second touch electrode value is greater than a predetermined threshold value.

13. The touch sensing method of claim 12, further comprising: substituting with 0 data of each of a plurality of first-direction sub patterns close to a first diagonal point positioned in the same row as the first touch and positioned in the same column as the second touch and substituting with 0 data of each of a plurality of first-direction sub patterns close to a second diagonal point positioned in the same column as the first touch and positioned in the same row as the second touch; and identifying touch coordinates based on the data of each of the plurality of first-direction sub patterns including the substituted data of each of the plurality of first-direction sub patterns and the data of each of the plurality of second-direction sub patterns.

14. The touch sensing method of claim 13, further comprising: for each first-direction pattern electrode of the plurality of first-direction pattern electrodes, determining data of each of the plurality of first-direction sub patterns based on a sensing value sensed by each first-direction pattern electrode and a sensing value sensed by at least one second-direction pattern electrode adjacent to the first-direction sub pattern of the plurality of first-direction sub patterns corresponding to each first-direction pattern electrode when it is determined that two diagonal touches occur; for each second-direction pattern electrode of the plurality of second-direction pattern electrodes, determining data of each of the plurality of second-direction sub patterns based on a sensing value sensed by each second-direction pattern electrode and data of at least one first- direction pattern electrode adjacent to the second-direction sub pattern of the plurality of second-direction sub patterns corresponding to each second-direction pattern electrode; and identifying touch coordinates based on the determined data of each of the plurality of first-direction sub patterns and the determined data of each of the plurality of second-direction sub patterns.

15. The touch sensing method of claim 14, wherein delta data, which is a difference between base data and the sensing values sensed by the plurality of first-direction pattern electrodes and the sensing values sensed by the plurality of second-direction pattern electrodes, is calculated, data of each of a plurality of first-direction sub patterns close to the first diagonal point and the second diagonal point is substituted with 0 in the calculated delta data when the sum of the first touch electrode value and the second touch electrode value is greater than the predetermined threshold value, and the touch coordinates are identified based on the delta data including the data of each of the plurality of first-direction sub patterns close to the first diagonal point and the second diagonal point, which is substituted with 0.

16. The touch sensing method of claim 13, wherein the data of each of the plurality of second-direction sub patterns is determined further based on the sensing values sensed by the plurality of second-direction pattern electrodes, and the data of each of the plurality of second-direction sub patterns is determined further based on data of the plurality of first-direction sub patterns adjacent to the second-direction pattern electrode corresponding to each second-direction sub pattern.

\* \* \* \* \*